(12) United States Patent
Iwami et al.

(10) Patent No.: US 8,325,817 B2
(45) Date of Patent: Dec. 4, 2012

(54) COMMUNICATION APPARATUS AND METHOD FOR DATA INTERPOLATION

(75) Inventors: Hideki Iwami, Saitama (JP); Satoshi Futenma, Tokyo (JP)

(73) Assignee: Sony Corporation, Tokyo (JP)

( * ) Notice: Subject to any disclaimer, the term of this patent is extended or adjusted under 35 U.S.C. 154(b) by 1419 days.

(21) Appl. No.: 11/749,682

(22) Filed: May 16, 2007

(65) Prior Publication Data

US 2007/0279683 A1  Dec. 6, 2007

(30) Foreign Application Priority Data

May 17, 2006 (JP) ................................ 2006-137133

(51) Int. Cl.
*H04N 7/12* (2006.01)
(52) U.S. Cl. .................................. 375/240.19
(58) Field of Classification Search ............. 375/240.19, 375/240
See application file for complete search history.

(56) References Cited

U.S. PATENT DOCUMENTS

| | | | | |
|---|---|---|---|---|
| 5,561,532 A * | 10/1996 | Ohnishi et al. | ................ | 386/264 |
| 5,901,242 A * | 5/1999 | Crane et al. | ................... | 382/166 |
| 6,694,040 B2 * | 2/2004 | Hayashi et al. | ................ | 382/100 |
| 7,460,628 B2 * | 12/2008 | Suzuki et al. | .................. | 375/354 |
| 2003/0101409 A1 * | 5/2003 | Levy et al. | ..................... | 714/789 |
| 2003/0172341 A1 * | 9/2003 | Inokuchi et al. | .............. | 714/768 |
| 2004/0062306 A1 * | 4/2004 | Takahashi et al. | ........ | 375/240.01 |
| 2005/0207495 A1 * | 9/2005 | Ramasastry et al. | ...... | 375/240.16 |
| 2008/0028281 A1 * | 1/2008 | Miyazaki et al. | ............. | 714/776 |

FOREIGN PATENT DOCUMENTS

| | | |
|---|---|---|
| JP | 2-172388 | 7/1990 |
| JP | 5-227517 | 9/1993 |
| JP | 08-172565 | 7/1996 |
| JP | 6-311494 | 11/1996 |
| JP | 10-23424 | 1/1998 |
| JP | 2002-300061 | 10/2002 |
| JP | 2003-69832 | 3/2003 |
| JP | 2003-069998 | 3/2003 |

* cited by examiner

*Primary Examiner* — Nirav B Patel
(74) *Attorney, Agent, or Firm* — Finnegan, Henderson, Farabow, Garrett & Dunner LLP

(57) ABSTRACT

A communication apparatus dividing an image for one field into a plurality of groups each including N lines (N≧1) and performing compression/decompression for each group includes a separator separating image data from reception data; a determination unit determining whether an error exists in the separated image data; a storage unit storing the image data as interpolation data when the determination unit determines that no error exists in the image data; a decoder decoding the image data; a first detection unit detecting a decoding position of the image data and a corresponding position of the interpolation data stored in the storage unit when the determination unit determines that an error exists in the image data and that the amount of missing data of the image data exceeds a threshold; and a reading unit reading the interpolation data in accordance with the detected decoding position and corresponding position.

24 Claims, 13 Drawing Sheets

COMMUNICATION APPARATUS AND METHOD FOR DATA INTERPOLATION

CROSS REFERENCES TO RELATED APPLICATIONS

The present invention contains subject matter related to Japanese Patent Application JP 2006-137133 filed in the Japanese Patent Office on May 17, 2006, the entire contents of which are incorporated herein by reference.

BACKGROUND OF THE INVENTION

1. Field of the Invention

The present invention relates to communication apparatuses, communication methods, communication transmission and reception apparatuses, communication transmission and reception methods, and programs, and more particularly, to a communication apparatus, a communication method, a communication transmission and reception apparatus, a communication transmission and reception method, and a program that can be used suitably when image compression is performed for each of a plurality of line blocks.

2. Description of the Related Art

Currently, data is transferred using various types of communication, such as Internet communication. In particular, image data is transferred via networks very often. In general, image data (in particular, moving image data) whose data amount is reduced by encoding processing (compression) performed by a transmitter is transmitted to a network. The encoded data is received and decoded (decompressed) by a receiver, and image playback is performed Moving picture experts group (MPEG) compression is the most widely known image compression technique. Recently, technological development of systems and image data transfer methods used in systems has been actively conducted in which an MPEG stream that is generated by MPEG compression and that is stored in an Internet protocol (IP) packet based on an IP is transferred via the Internet and a communication terminal, such as a personal computer, a personal digital assistant (PDA), or a cellular phone, receives the IP packet.

It is necessary to perform video on demand, streaming distribution of live images, or real-time communication, such as video conferencing or videophone systems, under the assumption that data transmission and reception is performed using terminals having different capabilities as reception terminals.

For example, transmission data transmitted from a single information transmission source is received and subjected to display processing by a reception terminal, such as a cellular phone, having a display with a lower resolution and having a central processing unit (CPU) with a lower processing capability and is also received and subjected to display processing by a reception terminal, such as a desktop personal computer, having a monitor with a higher resolution and having a CPU with a higher processing capability. As mentioned above, communication performed with various reception terminals having different processing capabilities while screen size is appropriately changed is becoming used.

As described above, as a method for allowing various reception terminals to achieve reception and display processing appropriate for respective processing capabilities, a method for hierarchically encoding data to be transmitted or received, that is, a communication system using hierarchical coding, has been suggested. In data communication using hierarchical coding, for example, encoded data to be processed by a reception terminal having a higher-resolution display and encoded data to be processed by a reception terminal having a lower-resolution display are separated so that the size or quality of an image can be changed in accordance with the separation.

For example, MPEG 4 and JPEG 2000 video streaming achieves compression/decompression using hierarchical coding. The MPEG 4 standard is scheduled to adopt a fine granularity scalability technique and to be profiled. Scalable distribution at a low bit rate and a high bit rate can be achieved with such a hierarchical coding technique. In addition, JPEG 2000 based on wavelet transform achieves, by using the characteristics of wavelet transform, packetization based on spatial resolution and hierarchical packetization based on image quality.

An example of a configuration of a communication terminal apparatus of the related art when interpolation processing is performed in accordance with MPEG or JPEG 2000 will be described with reference to FIG. 1. In FIG. 1, dotted-line arrows indicate the flow of control signals and solid-line arrows indicate the flow of data.

An image application manager 11 receives a transmission request from an application of an image source or the like, performs path control and quality of service (QoS) control over a wireless link, and controls data transmission and reception to and from the application. The image application manager 11 may also control an image input device, such as a charge-coupled device (CCD) or a complementary metal-oxide semiconductor (CMOS) sensor. A transmission data image compressor 12 compresses image data supplied from the image application manager 11 so as to reduce the amount of image data, and outputs the compressed image data to a transmission memory 13.

The transmission memory 13 stores data received from the transmission data image compressor 12. The transmission memory 13 supports the network environment, and has a function of storing data to be transferred to another terminal in accordance with routing information. In addition, the transmission memory 13 may store reception data.

A transmission/reception controller 14 controls a media access control (MAC) protocol, such as time division multiple access (TDMA) or carrier sense multiple access (CSMA). The transmission/reception controller 14 also performs media access control called preamble sense multiple access (PSMA), which is similar to CSMA and performs packet discrimination in accordance with preamble correlation and not in accordance with carrier correlation. A transmission data generator 15 starts an encoding operation in response to a request from the transmission/reception controller 14, and generates a transmission packet by reading data stored in the transmission memory 13.

A physical layer controller 16 controls a physical layer under the control of the transmission/reception controller 14 or the transmission data generator 15. A physical layer Tx 17 starts an operation in response to a request from the physical layer controller 16, and outputs to a transmission/reception switching unit 18 a transmission packet supplied from the transmission data generator 15.

The transmission/reception switching unit 18 has a function of performing switching between data transmission and data reception. If a transmission packet is supplied from the physical layer Tx 17, the transmission/reception switching unit 18 transmits the received transmission packet via an antenna 19. If a packet is received via the antenna 19, the transmission/reception switching unit 18 supplies the received packet to a physical layer Rx20.

The physical layer Rx20 starts an operation in response to a request from the physical layer controller 16, and supplies a reception packet to a reception data separator 21. The reception data separator 21 analyses the reception packet received from the physical layer Rx20, and separates the reception packet into data necessary for the image application manager 11 and data to be transmitted to another terminal in accordance with routing.

An image decoder 22 analyzes reception data separated by the reception data separator 21, and detects a playback position for each field or each predetermined number of fields in accordance with a corresponding field number. An interpolation data storage unit 23 stores image data separated by the reception data separator 21 for each predetermined number of fields or each field. An image data input switching unit 24 appropriately selects reception data supplied from the image decoder 22 or interpolation data supplied from the interpolation data storage unit 23 in accordance with management information supplied from the reception data separator 21, and supplies the selected data to a reception data decoder 25.

A basic operation of the communication terminal apparatus shown in FIG. 1 will now be described.

Concerning data reception, the communication terminal apparatus receives data transmitted from a transmitting station, which is an external communication apparatus, via the antenna 19, the transmission/reception switching unit 18, and the physical layer Tx 17, and the reception data separator 21 separates image data from the reception data. The separated image data is decoded by the image decoder 22, and image playback is performed on a display unit or the like (not shown).

Concerning data transmission, image data is compressed by the transmission data image compressor 12, and stored in the transmission memory 13. The transmission data generator 15 reads the stored image data, and generates a transmission packet. The generated transmission packet is transmitted to a transmitting station, which is an external communication apparatus, via the physical layer Tx 17, the transmission/reception switching unit 18, and the antenna 19.

With Motion JPEG 2000 (Part 3), which is capable of supporting moving images as well as static images, hierarchized data can be stored in a file format. Moreover, as a definite proposal relating to data communication using hierarchical coding, a technique based on discrete cosine transform (DCT) has been suggested. According to this technique, for example, image data serving as communication information is subjected to DCT processing, and hierarchization in which low frequencies and high frequencies are distinguished from one another can be achieved by DCT processing. A packet that is distinguished based on hierarchization between high frequencies and low frequencies is generated, and data communication is performed using such a packet.

For distribution of such image data that has been subjected to hierarchical coding, since real-time characteristics are requested, a user datagram protocol (UDP) is used as a communication protocol on the Internet. In addition, a real-time transport protocol (RTP) is used for an upper layer, and a data format stored in a communication packet complies with a format defined for each application, that is, each encoding method.

In addition, a communication environment using various types of communication, such as local-area networks (LANs) typified by Ethernet®, optical fibers, xDSLs, power line communications, and coax networks, has been developed and widely used. In addition, the wireless LAN marketplace has significantly expanded, and wireless LAN requirements have been increasing not only in offices but also in homes. As typical examples of wireless communication, Institute of Electrical and Electronics Engineers (IEEE) 802.11, Bluetooth, an ultrawide-band (UWB) system, and the like are available. Communication speed in such communication systems has been increasing yearly. However, since the image quality of content to be transmitted using such systems has been increasing, it is difficult to transmit such image content as non-compressed data. For example, high-definition multimedia interface (HDMI) Type-A, which is gaining popularity as a transmission medium for digital content, realizes a data transfer speed of approximately 4 Gbps (that is, 165-MHz clock×24-bit data width). However, there are few systems ensuring such a bandwidth with the throughput of an application layer.

For example, a technique described in Japanese Unexamined Patent Application Publication No. 6-311494 is available.

SUMMARY OF THE INVENTION

At the present time, mainstream image compression methods, such as MPEG and JPEG 2000, exhibit a very large coding delay (addition of encoding delay and decoding delay), such as one field (for a system including 60 fields per second, about 16 milliseconds for a progressive method and about 33 milliseconds for an interlaced method) or more. A requirement of "displaying a captured image in real timer", which is an obvious requirement in an analog era, is less important in today's digital era in which there is an increased demand for larger screens and higher image quality.

However, even in the digital era, there is still a demand for real-time characteristics. In the field of broadcasting, games, and electrical appliances, real-time characteristics, such as an improvement in responsiveness, are in high demand. Thus, recently, image compression (hereinafter, referred to as line-based compression/decompression (codec)) in which one field is divided into a plurality of groups each including N lines (N≧1) and image compression is performed for each group (hereinafter, referred to as a line block) so that a delay time is reduced has been attracting attention. Advantages of line-based codec include not only a low delay but also, for example, high-speed processing due to a smaller amount of information to be dealt with and a reduction in the size of hardware. However, there are many problems with systems using line-based codec.

Problems relating to the use of line-based codec in a communication system will be described below.

1) When an image compressed using line-based codec is transferred via a communication medium, it is necessary to perform interpolation for missing data, under the assumption of data missing during communication. The basic idea of MPEG or JPEG 2000 codec is to store data for one or more fields in a processing memory. However, for line-based codec, decoded image data for one field does not have to be stored since data decoding is normally performed in units of lines. Thus, since decoded image data for the previous field is not stored in a coder/decoder, a problem related to how data interpolation is to be performed occurs.

2) There is a problem relating to a deterioration in the communication environment. For a wireless system in which image transfer is performed using line-based codec, since a field memory does not necessarily have the same large capacity as that of a field memory used in the related art, deterioration in the environment is significantly reflected in image quality. In order to reduce the influence of the deterioration in the environment, instead of a procedure for reducing the capacity of a memory as in the related art, a procedure for preventing a user from recognizing the deterioration in the communication environment by reducing a codec rate is necessary.

3) When the codec rate is changed, it is necessary to perform rate changing processing at a high speed so as to prevent the user from coming under stress. However, when clipping is performed to magnify or reduce an effective screen size, the clock frequency of a clock input when a codec operation is performed may be changed. Thus, for variable clocks, a method for causing the rate changing processing to be less noticeable by the user is desired.

4) There is a problem relating to a reduction in an interpolation memory. The use of line-based codec significantly reduces the amount of memory necessary for image compression. Although an interpolation memory is necessary in terms of the reliability of the system, it is desirable not to provide an additional memory.

5) There is a problem relating to audio processing when interpolation processing for an image is performed. Since the transmission environment during the interpolation processing is inevitably deteriorated, an appropriate countermeasure is to be taken for processing of audio data at that time.

6) An appropriate countermeasure is to be taken in a case where image quality is markedly changed, for example, a scene change of a moving image. Since line-based codec efficiently deals with information between frames, as in MPEG 2, there are a smaller number of setting parameters exchanged between frames. Thus, in an environment, such as a scene change or channel switching of a moving image, in which image quality is changed significantly in the time axis, the image quality may be visually deteriorated.

It is desirable to appropriately perform interpolation processing for missing data for each of a plurality of line blocks.

According to an embodiment of the present invention, there is provided a communication apparatus dividing an image for one field into a plurality of groups each including N lines (N≧1) and performing compression/decompression for each group. The communication apparatus includes separating means for separating image data from reception data; determination means for determining whether or not an error exists in the image data separated by the separating means; storage means for storing the image data as interpolation data when the determination means determines that no error exists in the image data; decoding means for decoding the image data; first detection means for detecting a decoding position of the image data and a corresponding position of the interpolation data stored in the storage means when the determination means determines that an error exists in the image data and that the amount of missing data of the image data exceeds a threshold; and reading means for reading the interpolation data stored in the storage means in accordance with the decoding position and the corresponding position in the storage means that are detected by the first detection means.

The determination means may determine whether or not the amount of missing data of the image data exceeds the threshold by acquiring decoding information from the decoding means.

The storage means may store only image data of a predetermined subband.

The communication apparatus may further include image input switching means for selecting the image data or the interpolation data read by the reading means and for transferring the selected image data or interpolation data to the decoding means.

The decoding means may perform re-configuration. The image input switching means may select the interpolation data read by the reading means during execution of the re-configuration.

The communication apparatus may further include deleting means for deleting the oldest interpolation data from among stored interpolation data when the storage means is not capable of storing more data.

The communication apparatus may further include request means for requesting an external communication apparatus for a rate change when the determination means determines that the amount of missing data exceeds the threshold.

The communication apparatus may further include insertion means for inserting additional data. The separating means may separate audio data from the reception data. The determination means may determine whether or not the amount of image data separated by the separating means exceeds an image-data threshold. The insertion means may read the audio data in association with a reading timing of the decoding means for decoding the image data and inserts the additional data when the amount of audio data does not exceed an audio-data threshold.

When the amount of audio data exceeds the audio-data threshold, muting may be performed such that a deterioration is less noticeable even when muting is executed in a short period of time.

The determination means may determine whether or not the amount of audio data separated by the separating means exceeds the audio-data threshold. When the amount of image data exceeds the image-data threshold and the amount of audio data does not exceed the audio-data threshold, transfer may be performed without inserting mute data into the audio data.

The communication apparatus may further include compression means for performing image compression by setting to an encoding rate requested by an external communication apparatus; and transmission means for transmitting the image data that has been subjected to image compression by the compression means.

The communication apparatus may further include insertion means for inserting mute data. The separating means may separate audio data from the reception data. The determination means may determine whether or not the amount of audio data separated by the separating means exceeds an audio-data threshold. When the determination means determines that the amount of audio data exceeds the audio-data threshold, the insertion means may insert the mute data into the audio data.

The communication apparatus may further include second detection means for detecting whether or not a scene change exists in the image data. When the second detection means detects a scene change, the first detection means may read the interpolation data stored in the storage means in accordance with the decoding position and the corresponding position in the storage means.

The communication apparatus may further include request means for requesting an external communication apparatus to perform re-configuration of an inter-frame parameter when the second detection means detects a scene change.

The determination means may determine whether or not an error exists in the image data in accordance with parity information added to the image data or in accordance with the amount of decoded data decoded by the decoding means.

The storage means may store image data for a plurality of subbands. The first detection means may insert dummy data into data for a subband that is not stored in the storage means.

The communication apparatus may further include management means for linking the decoding position of the image data decoded by the decoding means with a reading position of the interpolation data in the storage means and for switching selection between the image data and the interpolation data in accordance with the threshold.

The management means may insert dummy data into a missing portion of the image data when the threshold is not exceeded.

The dummy data may be data having a high correlation with the preceding and following line blocks or half-tone data.

Once the dummy data has been inserted, the management means may delete normal data in a subband and inserts equivalent dummy data in the subband for all the plurality of groups each including N lines (N≧1) in a field or a predetermined number of fields.

According to an embodiment of the present invention, there is provided a communication method or a program for use in a communication apparatus dividing an image for one field into a plurality of groups each including N lines (N≧1) and performing compression/decompression for each group. The communication method or the program includes the steps of separating image data from reception data; determining whether or not an error exists in the separated image data; storing the image data as interpolation data when it is determined that no error exists in the image data; decoding the image data; detecting a decoding position of the image data and a corresponding position of the stored interpolation data when it is determined that an error exists in the image data and that the amount of missing data of the image data exceeds a threshold; and reading the stored interpolation data in accordance with the detected decoding position and corresponding position.

According to another embodiment of the present invention, there is provided a communication transmission and reception apparatus dividing an image for one field into a plurality of groups each including N lines (N≧1) and performing compression/decompression for each group. The communication transmission and reception apparatus includes separating means for separating image data from reception data; determination means for determining whether or not an error exists in the image data separated by the separating means; storage means for storing the image data as interpolation data when the determination means determines that no error exists in the image data; decoding means for decoding the image data; detection means for detecting a decoding position of the image data and a corresponding position of the interpolation data stored in the storage means when the determination means determines that an error exists in the image data and that the amount of missing data of the image data exceeds a threshold; reading means for reading the interpolation data stored in the storage means in accordance with the decoding position and the corresponding position in the storage means that are detected by the detection means; request means for requesting an external communication apparatus to change a coding rate or a communication rate; compression means for performing image compression at a changed encoding rate contained in information on a rate change transmitted from the external communication apparatus; and transmission means for transmitting the image data that has been subjected to image compression by the compression means.

According to another embodiment of the present invention, there is provided a communication transmission and reception method or a program for use in a communication transmission and reception apparatus dividing an image for one field into a plurality of groups each including N lines (N≧1) and performing compression/decompression for each group. The communication transmission and reception method or the program includes the steps of separating image data from reception data; determining whether or not an error exists in the separated image data; storing the image data as interpolation data when it is determined that no error exists in the image data; decoding the image data; detecting a decoding position of the image data and a corresponding position of the interpolation data stored in storage means when it is determined that an error exists in the image data and that the amount of missing data of the image data exceeds a threshold; reading the stored interpolation data in accordance with the detected decoding position and corresponding position in the storage means; requesting an external communication apparatus to change a coding rate or a communication rate; performing image compression at a changed encoding rate contained in information on a rate change transmitted from the external communication apparatus; and transmitting the image data that has been subjected to image compression.

As described above, image data is separated from reception data. If it is determined that no error exists in the separated image data, the image data is stored as interpolation data. If the image data is decoded and it is determined that the amount of missing data of the image data exceeds a threshold, a decoding position of the image data and a corresponding position of the stored interpolation data are detected, and the stored interpolation data is read in accordance with the detected decoding position and corresponding position.

In addition, as described above, image data is separated from reception data. If it is determined that no error exists in the separated image data, the image data is stored as interpolation data. If the image data is decoded and it is determined that the amount of missing data of the image data exceeds a threshold, a decoding position of the image data and a corresponding position of the stored interpolation data are detected. The stored interpolation data is read in accordance with the detected decoding position and corresponding position. Furthermore, if a request for changing a coding rate or a communication rate is requested to an external communication apparatus and information on a rate change is transmitted from the external communication apparatus, image compression is performed at a changed encoding rate contained in the information, and image data that has been subjected to image compression is transmitted.

Accordingly, interpolation processing for missing data can be appropriately performed for each line block.

In addition, image data that has been subjected to image compression at an encoding rate requested from an external communication apparatus can be transmitted while interpolation processing for missing data is appropriately performed for each line block.

DESCRIPTION OF THE PREFERRED EMBODIMENTS

Embodiments of the present invention will be described with reference to the drawings.

Figure 1:
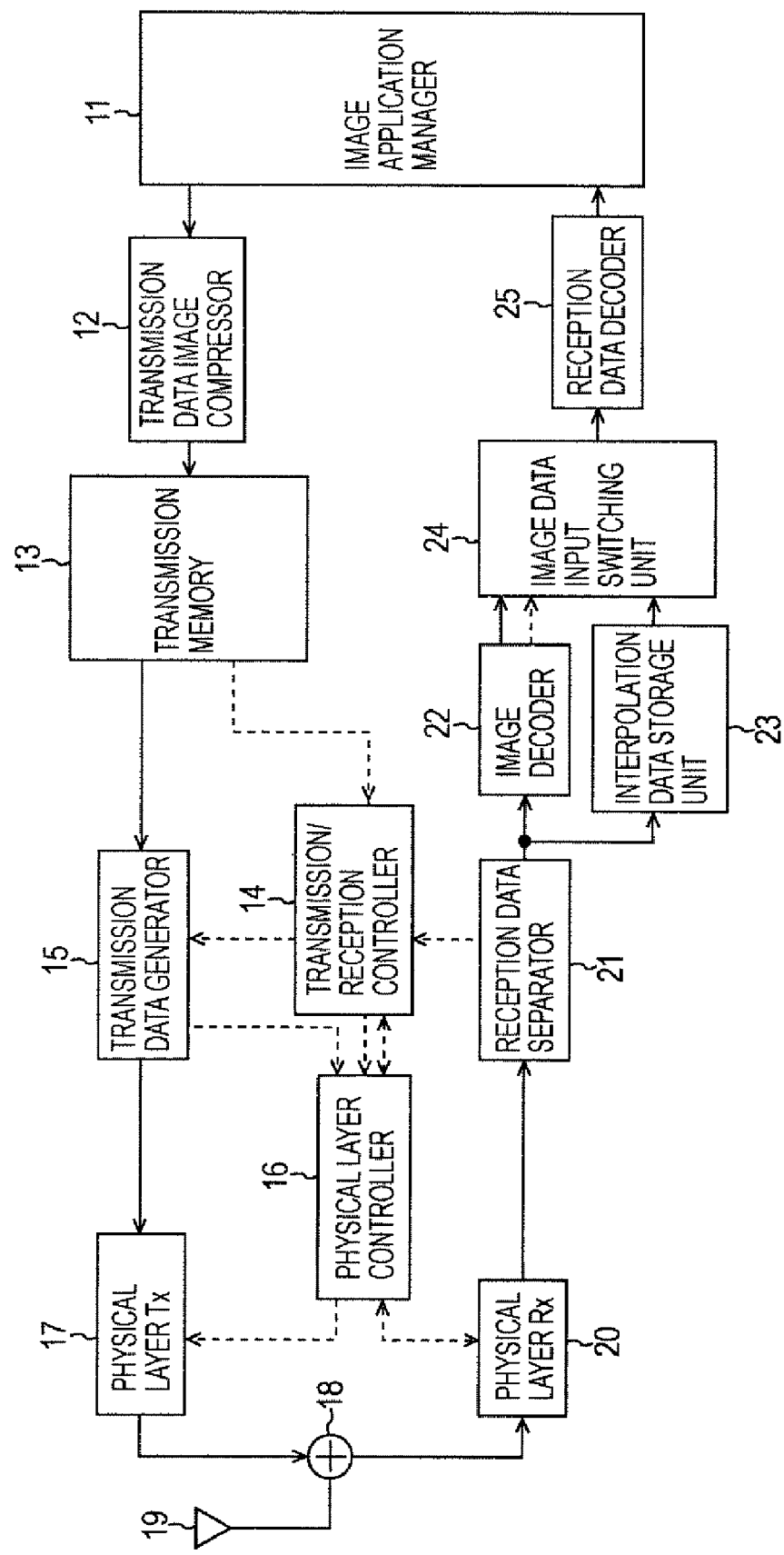
FIG. 1 is a block diagram showing an example of a configuration of a communication terminal apparatus according to the related art.
Figure 2:
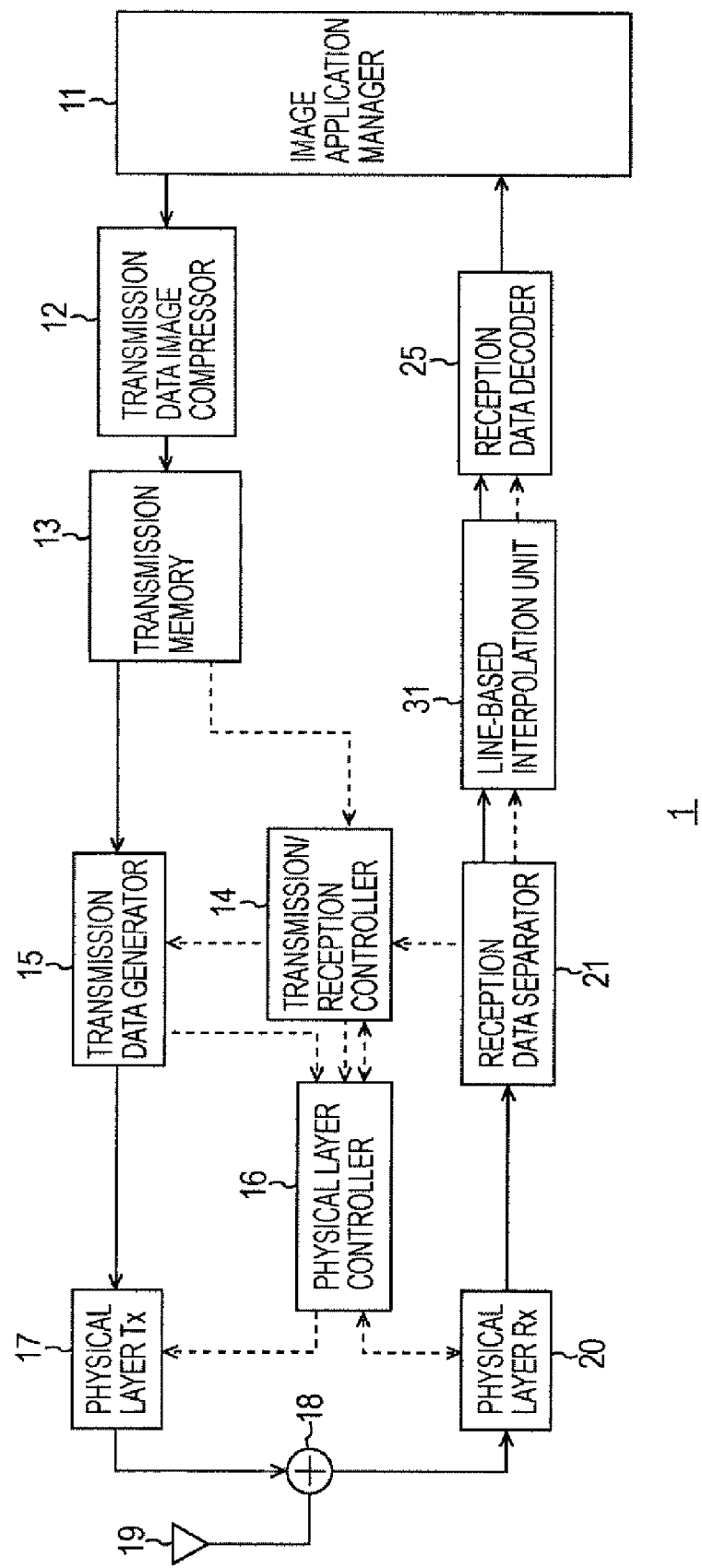
FIG. 2 is a block diagram showing an example of a configuration of a communication terminal apparatus according to an embodiment of the present invention.

FIG. 2 is a block diagram showing an example of a configuration of a communication terminal apparatus 1 according to an embodiment of the present invention. Component parts corresponding to component parts in the configuration of the related art are referred to with the same reference numerals and the descriptions of those same component parts will be omitted.

A line-based interpolation unit 31 performs interpolation processing that is specialized for line-based codec. The term "line-based codec" means image compression in which an image for one field is divided into a plurality of groups each including N lines (N≧1) and image compression is performed for each group (hereinafter, referred to as a line block), thus reducing a delay time.

A reception data decoder 25 decodes data supplied from an image data input switching unit 44, which will be described with reference to FIG. 3, and performs re-configuration under the control of the image data input switching unit 24.

Figure 3:
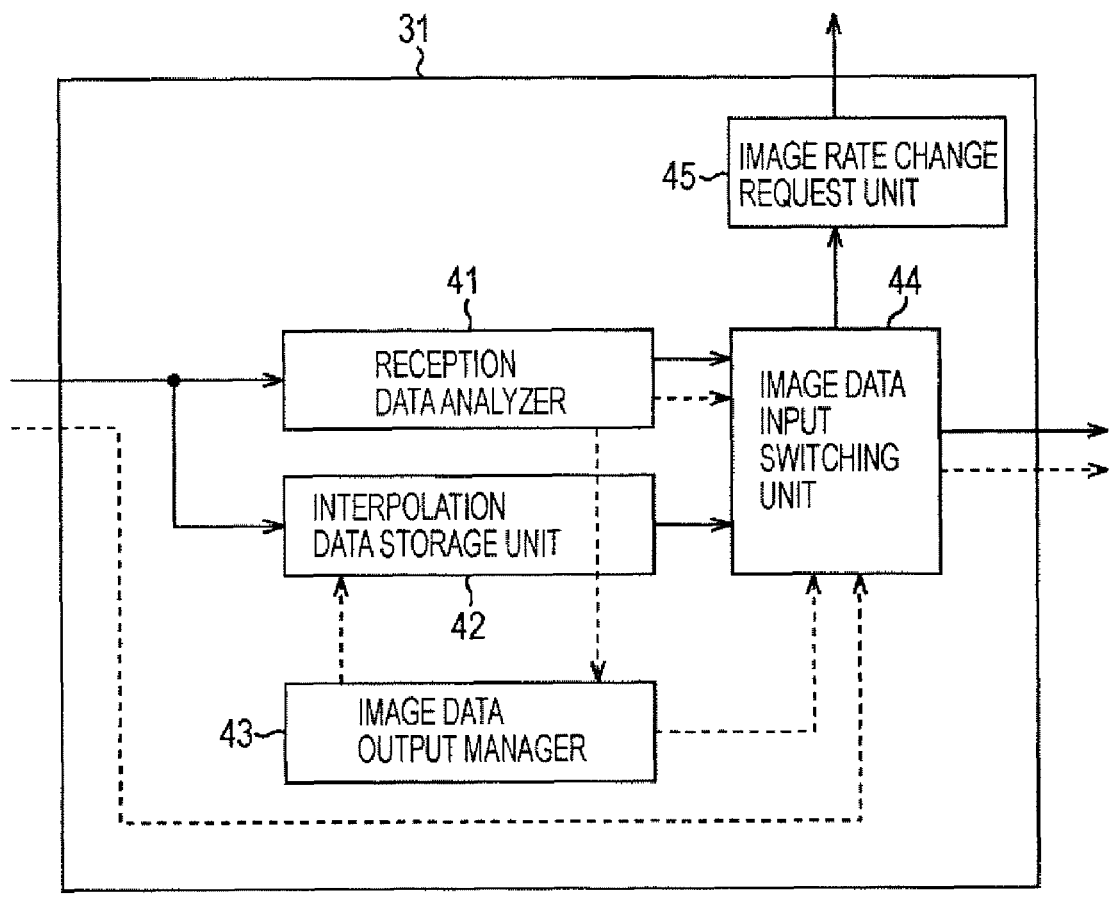
FIG. 3 is a block diagram showing an example of a detailed configuration of a line-based interpolation unit shown in FIG. 2.

FIG. 3 is a block diagram showing an example of a detailed configuration of the line-based interpolation unit 31. In FIG. 3, dotted-line arrows indicate the flow of control signals and solid-line arrows indicate the flow of data.

A reception data analyzer 41 analyzes reception data received from a reception data separator 21. The reception data analyzer 41 detects in which line of the screen and in which subband the reception data is located.

Figure 4:
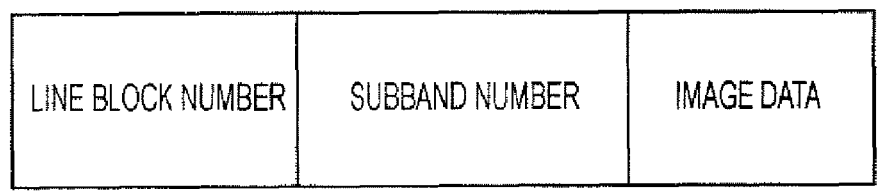
FIG. 4 illustrates a data format after image data is compressed.

FIG. 4 shows a data format of compressed image data to be transferred from and to a transmitting station and a receiving station. Referring to FIG. 4, the image data contains information identifying a line block number and a subband number. That is, the reception data analyzer 41 checks a line block number and a subband number contained in the reception data to detect in which line of the screen and in which subband the reception data is located. The data format shown in FIG. 4 is merely an example. Any format can be used as long as information identifying a line block and a subband is provided.

The reception data analyzer 41 determines whether or not the amount of missing data of the reception data exceeds a threshold in accordance with decoding information received from the reception data decoder 25. This function of the reception data analyzer 41 may be provided in the image data input switching unit 44 or the reception data decoder 25.

An interpolation data storage unit 42 stores reception data received from the reception data separator 21 at the same time as the reception data analyzer 41 receives the reception data. If it is determined that no missing data exists in the reception data, the interpolation data storage unit 42 can save the reception data as data for one field. The memory area of the interpolation data storage unit 42 is, for example, a data capacity for two fields.

Only image data for a certain number of low-frequency subbands from among image data for one field may be stored in the interpolation data storage unit 42. This is because it is assumed in this embodiment that image data is divided into a plurality of frequency components. As an algorithm for dividing image data into a plurality of frequency components, wavelet transform is adopted. The principle of wavelet transform is described next.

Figure 5:
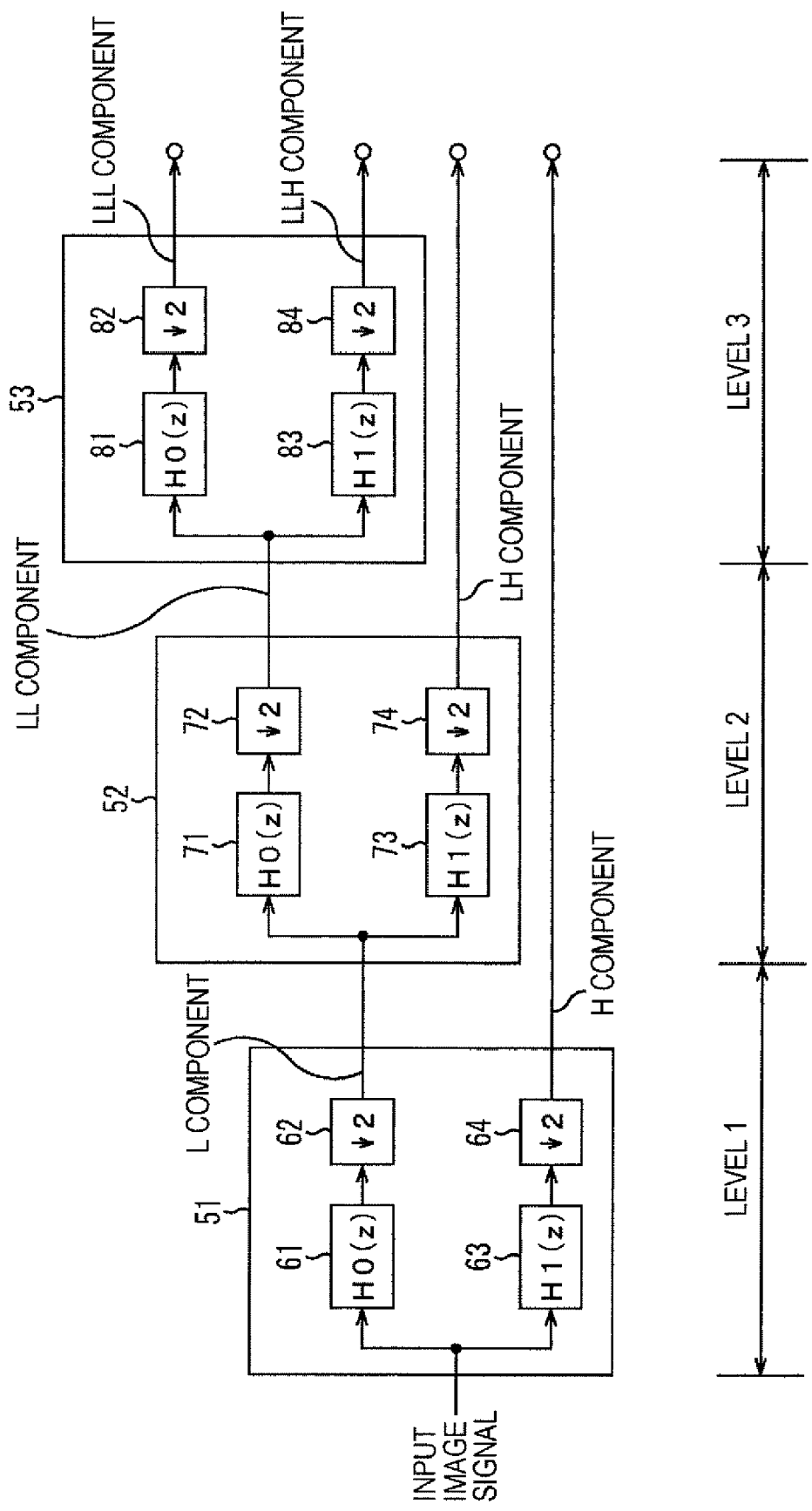
FIG. 5 is a block diagram showing an example of a configuration of an encoder that performs wavelet transform.

FIG. 5 is a block diagram showing an example of a configuration of an encoder that executes wavelet transform. An example in which octave division, which is the most general wavelet transform method from among some wavelet transform methods, is performed over a plurality of levels is shown in FIG. 5.

The encoder shown in FIG. 5 divides an image signal into high frequencies and low frequencies at three levels (from level 1 to level 3) and hierarchically divides only the low-frequency components. Although wavelet transform for a one-dimensional image signal (for example, horizontal components of an image) is shown in FIG. 5 for the sake of convenience, wavelet transform for a two-dimensional image signal (vertical components and horizontal components of an image) can be achieved by two-dimensionally expanding wavelet transform for a one-dimensional image signal.

A circuit unit 51 at level 1 includes a low-pass filter 61, a downsampler 62, a high-pass filter 63, and a downsampler 64. A circuit unit 52 at level 2 includes a low-pass filter 71, a downsampler 72, a high-pass filter 73, and a downsampler 74. A circuit unit 53 at level 3 includes a low-pass filter 81, a downsampler 82, a high-pass filter 83, and a downsampler 84.

An input image signal is subjected to subband division by the low-pass filter 61 (with a transmission function of H0(z)) and the high-pass filter 63 (with a transmission function of H1(z)). The resolution of each of a low-frequency component and a high-frequency component obtained by the subband division is downsampled to half by the downsamplers 62 and 64, respectively.

A signal of the low-frequency component ("L component" in FIG. 5) downsampled by the downsampler 62 is further subjected to subband division by the low-pass filter 71 (with a transmission function of H0(z)) and the high-pass filter (with a transmission function of H1(z)) of the circuit unit 52. The resolution of each of a low-frequency component ("LL component" in FIG. 5) and a high-frequency component ("LH component" in FIG. 5) obtained by the subband division is downsampled to half by the downsamplers 72 and 74, respectively.

A signal of the low-frequency component ("LL component" in FIG. 5) downsampeld by the downsampler 72 is further subjected to subband division by the low-pass filter (with a transmission function of H0(z)) and the high-pass filter 83 (with a transmission function of H1(z)) of the circuit unit 53. The resolution of each of a low-frequency component and a high-frequency component obtained by the subband division is downsampled to half by the downsamplers 82 and 84, respectively As described above, with subband division performed until a predetermined level is reached, a plurality of subband components obtained by hierarchical subband division of low-frequency components are sequentially generated. That is, in the example shown in FIG. 5, as a result of subband division until level 3, a high-frequency component ("H component" in FIG. 5) downsampled by the downsampler 64, a high-frequency component ("LH component" in FIG. 5) downsampled by the downsampler 74, a high-frequency component ("LLH component" in FIG. 5) downsampled by the downsampler 84, and a low-frequency component ("LLH component in FIG. 5) downsampled by the downsampler 82 are generated.

Figure 6:
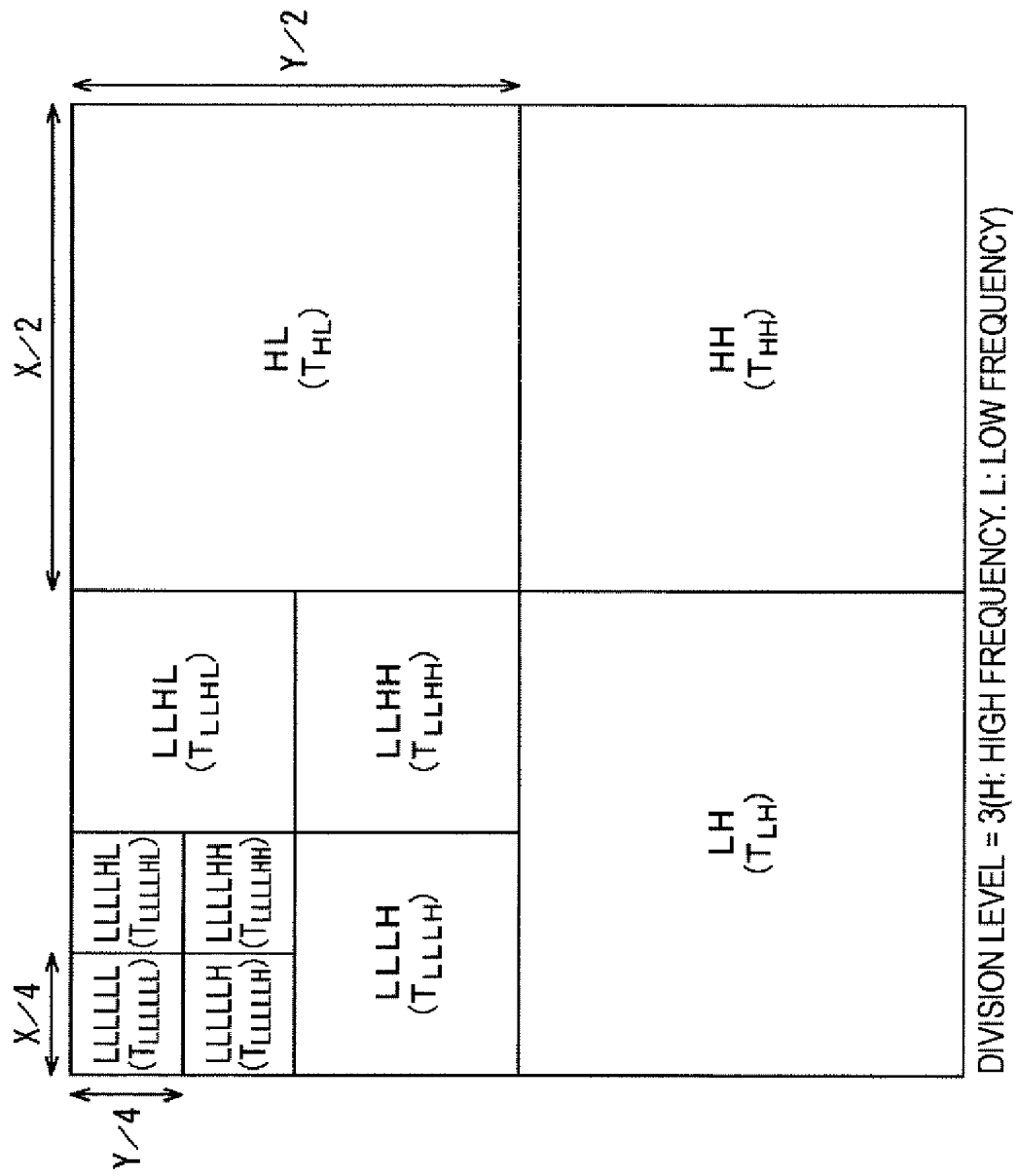
FIG. 6 shows subband components obtained by performing subband division for a two-dimensional image until level 3.

FIG. 6 shows subband components obtained by performing subband division until level 3 for a two-dimensional image. The notation of "L" and "H" shown in FIG. 6 is different from the notation of "L" and "H" in FIG. 5 in which a one-dimensional signal is used. That is, in FIG. 6, with subband division (horizontal and vertical directions) at level 1, fourth components, "LL", "LH", "HL", and "HH", are generated. Here, "LL" indicates that both the horizontal and vertical components are "L", "LH" indicates that a horizontal component is "H" and a vertical component is "L". Then, the LL component is further subjected to subband division, and four components, "LLLL", "LLHL", "LLLH" and "LLHH" are generated. Furthermore, the LLLL component is further subjected to subband division, and four components, "LLLLLL", "LLLLHL", "LLLLLH", and "LLLLHH", are generated. Each component obtained by subband division is called a subband.

As described above, only image data for a certain number of low-frequency subbands from among subband components obtained by subband division may be stored in the interpolation data storage unit 42. Alternatively, only image data for a subband may be stored in the interpolation data storage unit 42.

In wavelet transform processing, progression coding based on a progressive sequence is executable. More specifically, hierarchical coding corresponding to various progression modes, such as progressive based on spatial resolution, progressive based on a signal to noise ratio (SNR), that is, image quality, and progressive based on color components (RGB or YCbCr), is available.

Progression coding is often used in image distribution via the Internet or the like. A data-receiving terminal is capable of performing gradual decoding and displaying processing for, for example, first outputting and displaying coarse image data and then sequentially outputting and displaying finer images. As an example of progression coding, encoded data of high-frequency image data corresponding to a fine image is generated on the basis of encoded data of low-frequency image data corresponding to a coarse image. A terminal that decodes and displays data first decodes and displays encoded data of low-frequency image data, thus being capable of displaying a rough coarse image on the display in a short period of time. The terminal then decodes and displays encoded data in a high-frequency range, thus being capable of gradually displaying finer images.

Concerning progression coding, in addition to a configuration in which gradual processes are performed for different resolutions, a configuration in which a plurality of phases of SNR, that is, image quality is set, such as a configuration in which encoding is performed such that high SNR (high image quality) is distinguished from encoded data having low SNR (low image quality) or a configuration adopting progression based on color components (RGB or YCbCr), that is, encoding for each color component (RGB or YCbCr), is available.

Referring back to FIG. 3, an image data output manager 43 controls a read pointer of each of the reception data analyzer 41 and the interpolation data storage unit 42 as management information so that the image data input switching unit 44 can perform input switching in a short period of time. The determination on input switching is performed on the basis of a threshold set in advance. If the threshold is not exceeded, dummy data is inserted in a missing portion of reception data. Data having a high correlation with the preceding and following line blocks or half-tone data is used as dummy data. With this processing block, even if part of reception data in a certain field is lost, an image is played back from the same line of the immediately previous field. Thus, the reliability of the image is increased. In addition, the image data output manager 43 includes a function of inserting dummy data into information of a subband not stored in the interpolation data storage unit 42.

Once dummy data has been inserted, the image data output manager 43 deletes normal data in a subband and inserts equivalent dummy data in the subband for all the groups each including N lines (N≧1) in a field or a predetermined number of fields. That is, for line codec, if dummy data is inserted in a line or a line block and received data is inserted in the other lines or other line blocks, a user may detect banding noise. Thus, when dummy data is inserted in a line or a line block in a field, even if the amount of data that can be normally received is provided in the field or in a predetermined number of fields, an equivalent number of pieces of dummy data are inserted. Thus, an image with less deterioration can be generated.

The image data input switching unit 44 appropriately selects reception data supplied from the reception data analyzer 41 or interpolation data read from the interpolation data storage unit 42 in accordance with management information supplied from the image data output manager 43 or the reception data separator 21, and outputs the selected data to the reception data decoder 25.

When an image source to be decoded by the reception data decoder 25 is interpolation data read from the interpolation data storage unit 42, an image rate change request unit 45 starts requesting a transmitting station for an encoding rate change. Since the image rate change request unit 45 promptly starts requesting for an encoding rate change at a point in time when the image data input switching unit 44 selects the interpolation data storage unit 42, even when the transfer environment is temporarily deteriorated in the next field due to a reduced encoding rate, a reliable image can be played back. In addition, for example, the image rate change request unit 45 may not only control an encoding rate but also perform rate control of a wireless link by controlling the transmission data generator 15 of the transmitting station.

A storage process performed by the communication terminal apparatus 1 is described next with reference to a flowchart shown in FIG. 7.

In step S1, the reception data separator 21 separates image data from data received via an antenna 19, a transmission/reception switching unit 18, and a physical layer Rx20. In step S2, the reception data separator 21 checks if an error exists in image data for one field in accordance with uncorrectable information, such as reed solomon (RS), added to the image data or parity checking, such as cyclic redundancy check (CRC). However, the reception data separator 21 may not perform error checking. The reception data decoder 25 may determine whether or not part of data is lost in accordance with insertion of dummy data due to insufficient data (that is, the decoded data amount).

In step S3, the reception data separator 21 determines whether or not an error exists in the image data in accordance with a result of the checking processing of step S2. If it is determined in step S3 that no error exists in the image data, the process proceeds to step S4. In step S4, the reception data separator 21 saves the image data for one field, which is separated by the processing of step SI, in the interpolation data storage unit 42. The saved image data is stored as interpolation data in the interpolation data storage unit 42.

In step S5, the image data output manager 43 determines whether or not interpolation data for two fields is saved in the interpolation data storage unit 42. If it is determined in step S5 that interpolation data for two fields is saved in the interpolation data storage unit 42, the process proceeds to step S6. In step S6, the image data output manager 43 deletes interpolation data of the older one of the two fields saved in the interpolation data storage unit 42.

If it is determined in step S5 that interpolation data for two fields is not saved in the interpolation data storage unit 42, that is, if the current storage processing is performed for the first field or the second field, the processing of step S6 is skipped.

If it is determined in step S3 that an error exists in the reception data, the process proceeds to step S7. In step S7, although the reception data separator 21 causes the image data for one field, which is separated by the processing of step S1, to be stored in the interpolation data storage unit 42, immediately after that, the image data output manager 43 deletes the interpolation data stored in the interpolation data storage unit 42. In actual processing, a write pointer of a memory is merely returned to the original position.

With the above-described storage process, image data for one field is saved as interpolation data in the interpolation data storage unit 42. The interpolation data storage unit 42 includes a memory area for two fields because the above-described storage process and a read process, which will be described below with reference to a flowchart shown in FIG. 8 (hereinafter, referred to as double buffering), can be performed at the same time.

Although image data for one field is saved in step S4 when it is determined in step S3 that no error exists in the image data, the determination is not particularly limited to whether or not an error exists. For example, the determination is made based on, for example, whether or not an error rate exceeds a predetermined threshold.

In addition, although the interpolation data storage unit 42 has a storage area for saving interpolation data for two fields in this embodiment, the interpolation data storage unit 42 does not necessarily have a storage area for saving interpolation data for two fields. That is, since many algorithms for analogizing interpolation information, such as motion compensation or prediction coding using the correlation between fields or between frames, are available, any of such algorithms may be used in this embodiment. If the correlation between fields or between frames is used, it is necessary to save data for a plurality of fields. Thus, a memory capable of storing a corresponding amount of data may be provided. In addition, the above-mentioned double buffering is merely a procedure for easily performing memory processing, and double buffering is not necessarily performed. Any other memory control procedures may be adopted.

The read process performed by the communication terminal apparatus 1 is described next with reference to a flowchart shown in FIG. 8.

In step S11, the reception data analyzer 41 receives decoding information from the reception data decoder 25, and detects a decoding state. More specifically, for example, a method for detecting the frequency of occurrence of compulsory decoding in the reception data decoder 25 is available. Compulsory decoding is performed in order to prevent occurrence of overflow or underflow in decoding processing performed by the reception data decoder 25. In the compulsory decoding, if the reception data separator 21 determines that an error exists in part of reception data, the error data is deleted without being transferring to the reception data decoder 25 and dummy data is inserted in place of the deleted data. Alternatively, a decoding state may be detected using a result of parity checking performed by the reception data separator 21.

In step S12, the reception data analyzer 41 checks if the amount of missing data of the received image data exceeds a threshold in accordance with the decoding information received by the processing of step S11. In step S13, the reception data analyzer 41 determines whether or not the amount of missing data exceeds the threshold in accordance with a result of the processing of step S12, If it is determined in step S13 that the amount of missing data exceeds the threshold, the process proceeds to step S14.

In step S14, in order to perform interpolation for the missing data due to the error in the reception data, the image data output manager 43 detects a decoding position indicating the position of an image at which decoding is being performed on the basis of the data being decoded by the reception data decoder 25. The decoding position is a position determined in accordance with information that indicates a line or a line block in a field. In step S15, in accordance with the positional information obtained by the processing of step S14, the image data output manager 43 detects a corresponding position of the interpolation data of the immediately previous field having no error stored in a save area of the interpolation data storage unit 42.

In step S16, the image data output manager 43 reads from the interpolation data storage unit 42 interpolation data from the corresponding position detected by the processing of step S15, and transfers the read interpolation data to the reception data decoder 25 via the image data input switching unit 44. That is, in image data input to the reception data decoder 25, image return occurs in which a previous image is provided from a certain position of a field. However, for a moving image having a field interval or a frame interval of 24 pictures or more, such image return does not cause a visual problem.

If it is determined in step S13 in accordance with the result of the processing of step S12 that the amount of missing data of the received image data does not exceed the threshold, the processing of steps S14 to S16 is skipped.

With the above-described read process, when the amount of missing data of the received data exceeds the threshold, image data saved in the interpolation data storage unit 42 is read.

Figure 7:
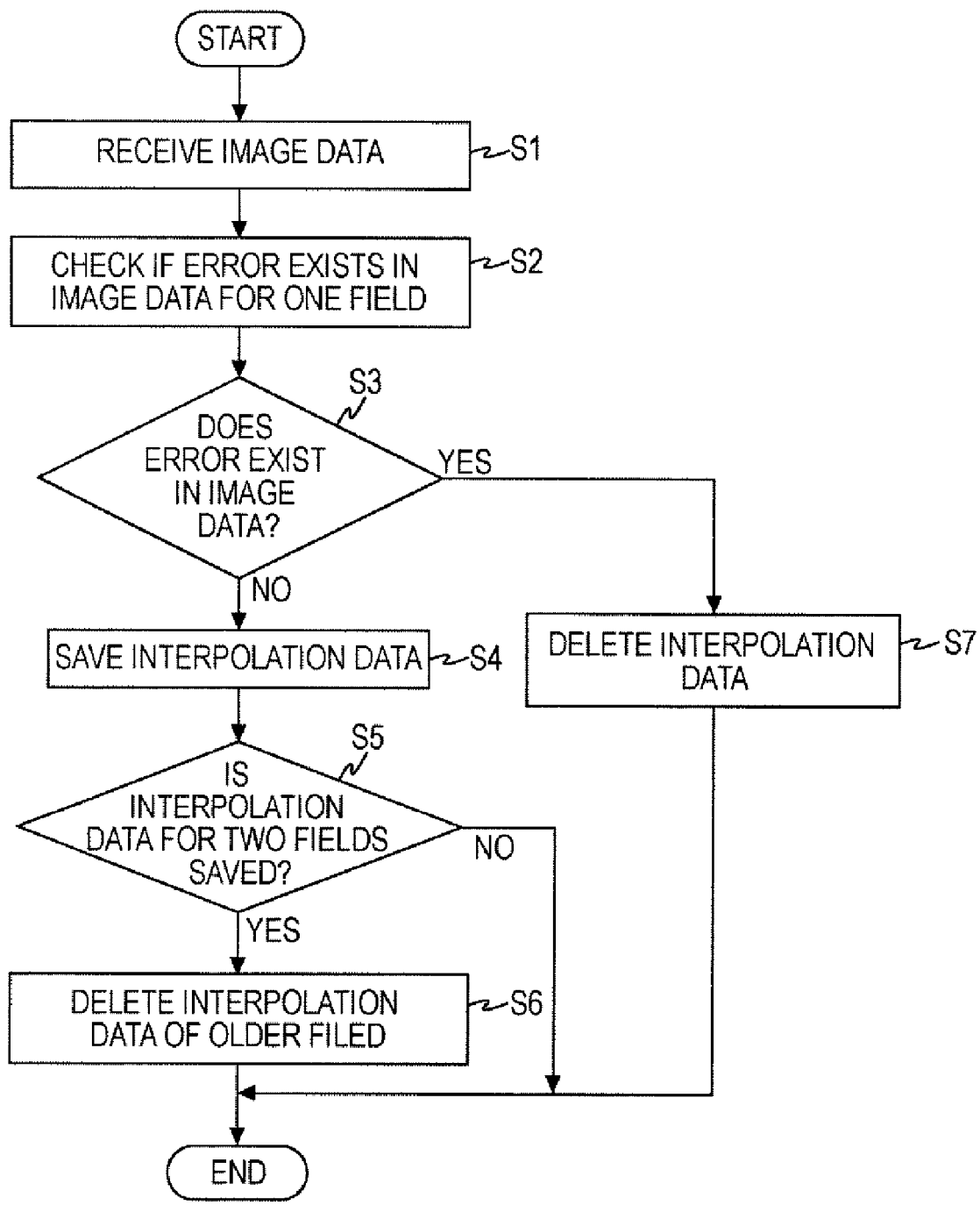
FIG. 7 is a flowchart showing a storage process;
FIG. B is a flowchart showing a read process.

If the determination as to the amount of missing data in step S12 is performed by the processing of step S2 shown in FIG. 7, it is not necessary to perform the processing of step S13. In addition, the segmentation of data is based on a field in step S15. Field-based segmentation is not necessarily screen segmentation corresponding to HSYNC (horizontal synchronization). That is, data corresponding to one field can be stored in the interpolation data storage unit 42. Furthermore, although a frame interval is set to 24 pictures or more in step S16, the frame interval is not particularly limited and depends on an application.

Figure 8:
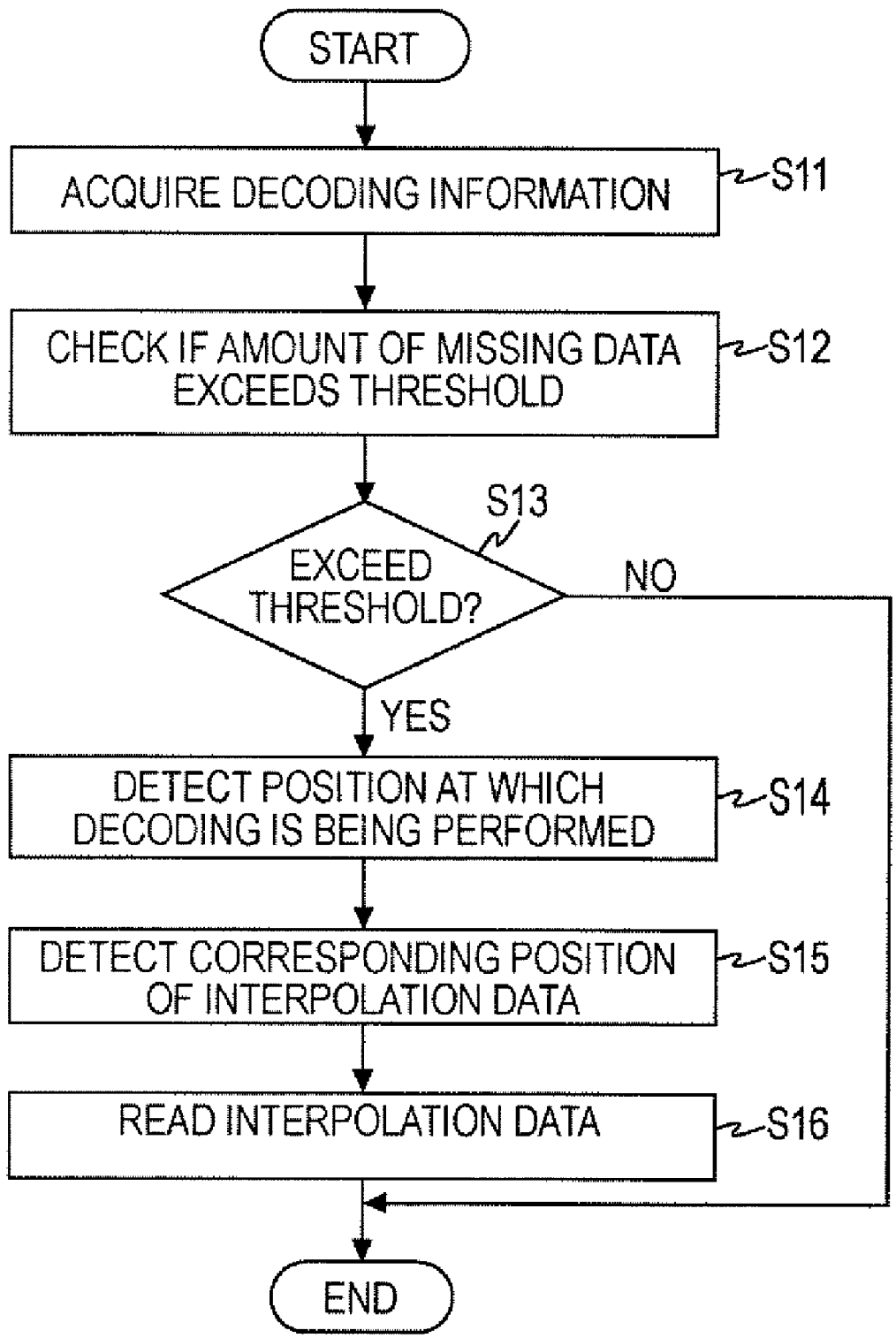

The storage process shown in FIG. 7 and the read process shown in FIG. 8 are performed at the same time.

The above description has been provided under the assumption of a wireless environment in which errors frequently occur. However, a wired environment using, for example, telephone lines (including asymmetric digital subscriber line (ADSL), local-area networks (LANs), electric power lines, coax networks, or optical fibers may be used.

Although the interpolation data storage unit 42 stores data for one field, the size of interpolation data to be stored in the interpolation data storage unit 42 is not particularly limited For example, if data for a predetermined number of fields is stored, the image data input switching unit 44 uses a longer switching time, thus achieving more reliable image playback. Furthermore, if image data for a certain number of low-frequency subbands is stored, a necessary memory capacity can be reduced and a moving image with less noticeable loss can be achieved.

In addition, it may be assumed that, for interpolation data, a buffer is mounted in a display unit disposed the most downstream in a television receiver or a liquid crystal display (LCD). Normally, the display unit includes a memory for storing data for a plurality of fields or frames. By providing the memory with a stop function of stopping the buffer mounted in the display unit, the buffer mounted in the display unit may be substituted for the interpolation data storage unit 42. In this case, if it is determined that it is necessary to receive an image source from the interpolation data storage unit 42, the buffer mounted in the display unit is temporarily stopped under the control of the interpolation data storage unit 42.

Processing performed by the communication terminal apparatus 1 using line-based codec for changing an image compression rate (transmission rate) will be described next.

Figure 9:
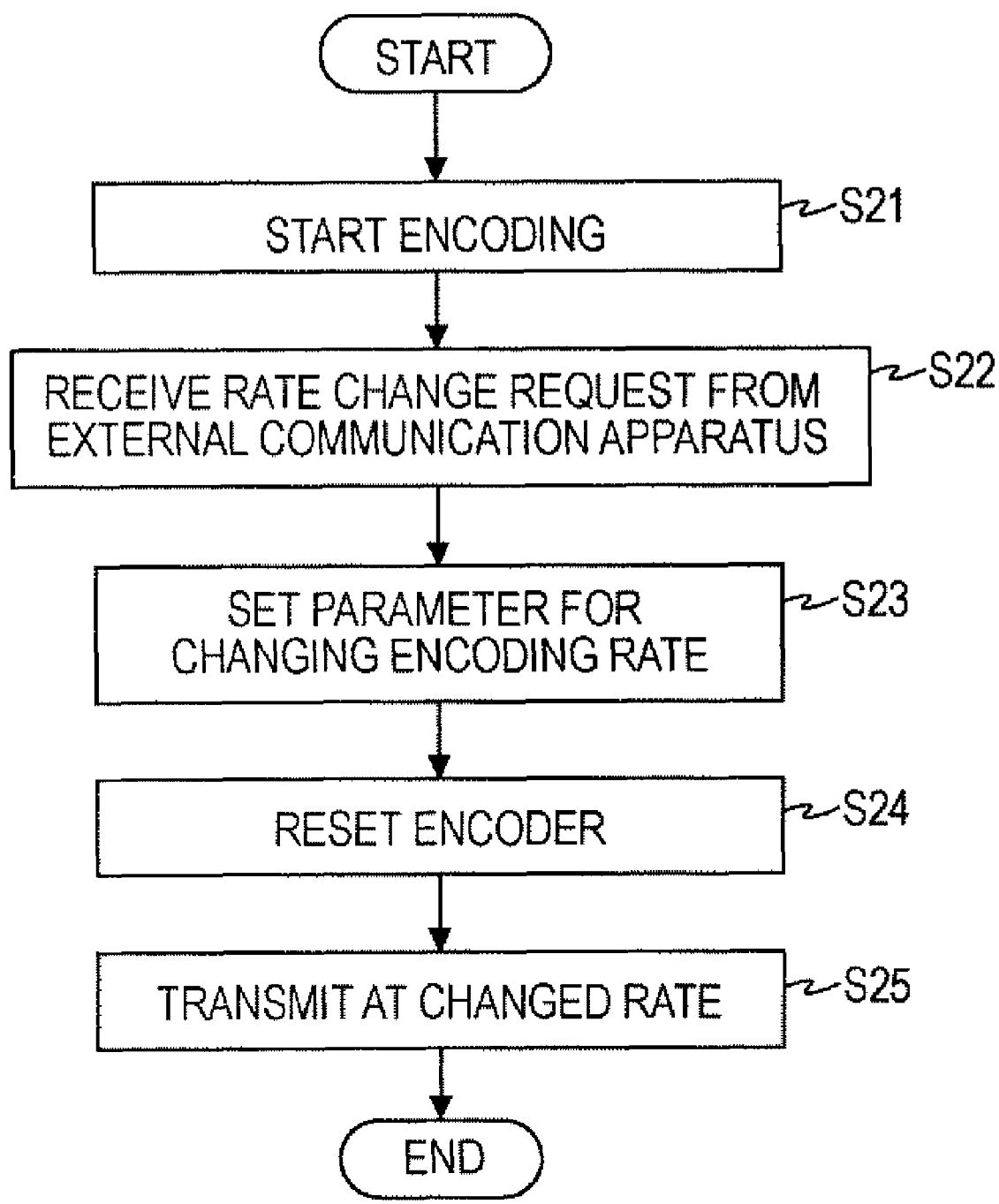
FIG. 9 is a flowchart showing a transmission process.

A transmission process performed by a transmitting station of the communication terminal apparatus 1 is described next with reference to a flowchart shown in FIG. 9.

In step S21, the transmission data generator 15 performs encoding configuration to start encoding. In step S22, by using command control for performing system control between transmitting and receiving stations, the reception data separator 21 receives, via the antenna 19, the transmission/reception switching unit 18, and the physical layer Rx20, a rate change request relating to an encoding setting value transmitted from an external communication apparatus.

In step S23, in accordance with the setting change request relating to encoding received by the processing of step S22, the image rate change request unit 45 performs re-configuration in order to change an encoding rate, and causes the transmission data generator 15 to set a parameter for setting an encoding rate desired by the external communication apparatus. The rate change does not necessarily relate to codec. For example, re-configuration of an encoding rate and communication configuration may be performed.

In step S24, since an operation uncertainty, such as changing of the clock frequency of an input clock, occurs, the transmission data generator 15 performs a reset operation. In step S25, the transmission data generator 15 performs encoding on the basis of the parameter for changing an encoding rate set by the processing of step S23, and transmits the changed rate to the external communication apparatus via the physical layer Tx 17, the transmission/reception switching unit 18, and the antenna 19.

With the above-described transmission process, the encoded rate desired by the external communication apparatus can be set, and data can be transmitted at the changed transfer rate.

Figure 10:
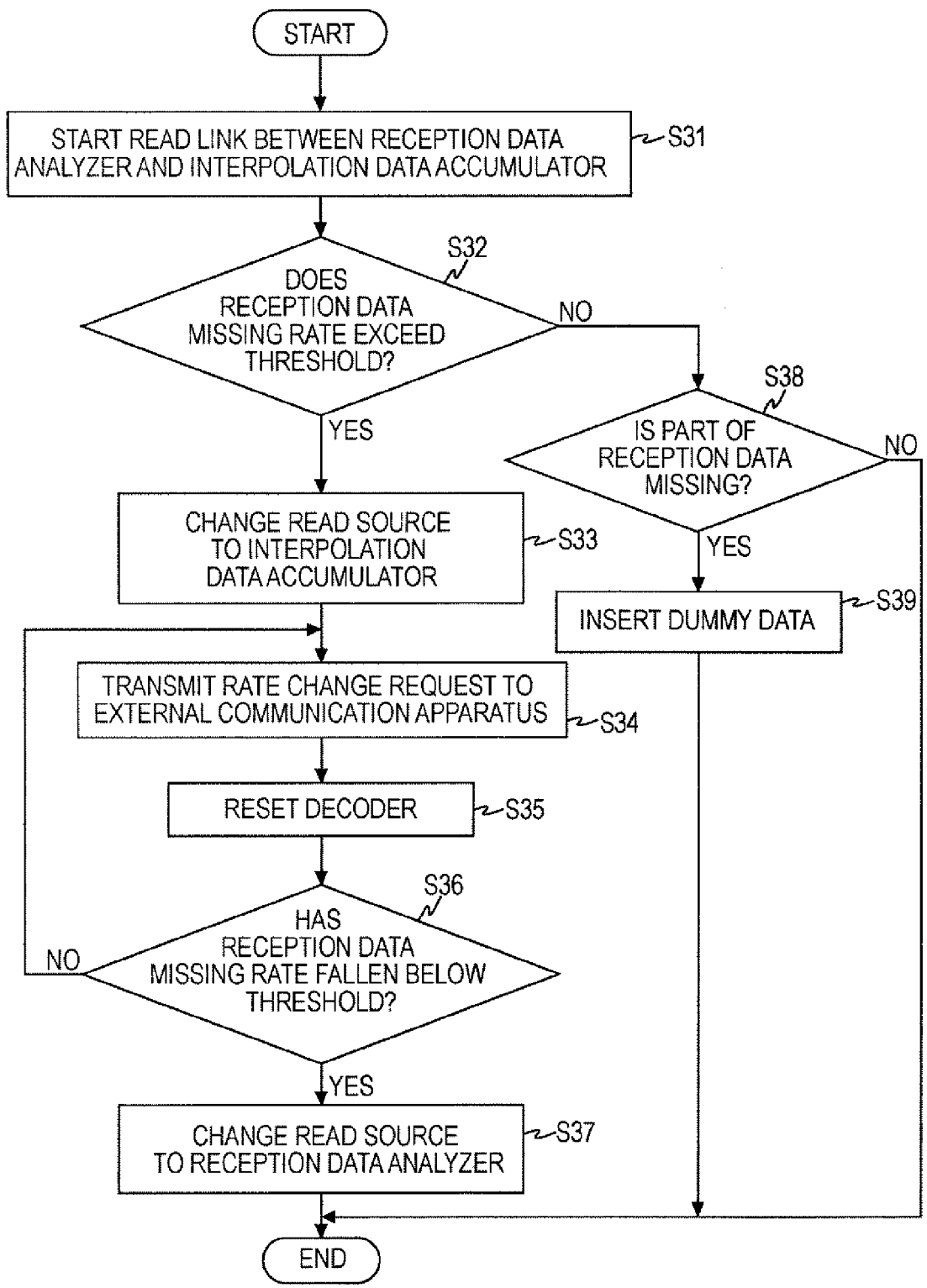
FIG. 10 is a flowchart showing a reception process.

A reception process performed by a receiving station of the communication terminal apparatus 1 is described next with reference to a flowchart shown in FIG. 10.

In step S31, the reception data separator 21 starts a read link between a decoding line of the reception data analyzer 41 and the interpolation data storage unit 42. The reception data separator 21 extracts only image data from transfer data received via the antenna 19, the transmission/reception switching unit 18, and the physical layer Rx20, and supplies the extracted image data to the reception data analyzer 41 and the interpolation data storage unit 42.

An image of a field that precedes the current field by one or more fields and that does not include a transfer error is stored in the interpolation data storage unit 42. Thus, if it is determined that image data information input to the reception data analyzer 41 is insufficient, that is, if it is determined that an error exceeding a predetermined threshold occurs in a decoding side due to packet loss in a transmission path or the like, the image data input switching unit 44 sets an image source to be input to the reception data decoder 25 from the interpolation data storage unit 42, not from the reception data analyzer 41. In order to realize an image source change for each line or each line block (for example, each line block includes 16 lines), which is a unit of decoding processing performed by the reception data decoder 25, unlike changing for each field or each frame in the related art, a packet received from the reception data separator 21 includes information for identifying a line block number or a subband number, as shown in FIG. 4.

The image data output manager 43 checks a line block number and a subband number input to each of the reception data analyzer 41 and the interpolation data storage unit 42, and provides a link between the reception data analyzer 41 and the interpolation data storage unit 42. Thus, an image with a reduced error can be input to the reception data decoder 25.

In step S32, if the reception data separator 21 determines that the missing rate (or error rate) of the reception data exceeds a threshold set in advance, the process proceeds to step S33. In step S33, the image data input switching unit 44 changes a read source from the reception data analyzer 41 to the interpolation data storage unit 42.

In step S34, the image rate change request unit 45 requests, by command transmission via the transmission data generator 15, the physical layer Tx 17, the transmission/reception switching unit 18, and the antenna 19, an external communication apparatus to change an encoding rate.

In step S35, since an operation uncertainty, such as changing of the clock frequency of an input clock, occurs, the reception data decoder 25 performs a reset operation for decoding of the next field. In step S36, the reception data separator 21 starts reception of data at an encoding rate changed by the external communication apparatus, and detects whether or not missing data exists in the reception data at the rate. If it is determined that the missing rate of the reception data has not fallen below the threshold, the process returns to step S34. Then, the subsequent processing is repeated.

If it is determined in step S36 that the missing rate of the reception data has fallen below the threshold, the process proceeds to step S37. Since the certainty of the reception data is determined by the processing of step S35, the image data input switching unit 44 changes a read source of data to be decoded from the interpolation data storage unit 42 to the reception data analyzer 41 in step S37. If the missing rate is not below the threshold even at the lowest encoding rate, information on the deterioration in a communication state may be transmitted to a display unit (not shown) and the information may be displayed on the display unit.

If it is determined in step S32 that the missing rate of the reception data does not exceed the threshold, the process proceeds to step S38. In step S38, the reception data separator 21 determines whether or not data missing exists in the reception data. If it is determined in step S38 that data missing exists in the reception data, the process proceeds to step S39. In step S39, the reception data analyzer 41 performs simple interpolation processing for reception data whose error rate does not reach the threshold, for example, by inserting dummy data in accordance with a presumption based on image information of data around the current data by using an image filter. The obtained interpolation data is output to the reception data decoder 25 via the image data input switching unit 44.

If it is determined in step S38 that no data missing exists in the reception data, the processing of step S39 is skipped. Then, the reception process is terminated.

With the above-described reception process, if the missing rate of the reception rate exceeds the threshold, saved interpolation data can be used for decoding. In addition, by requesting an external communication apparatus to change an encoding rate, the encoding rate of data transmitted next can be reduced, thus achieving an excellent transfer environment.

Although an example in which the encoding rate is reduced has been described above, the same is applicable to a case where the encoding rate is increased.

Although the number of lines constituting a line block, which is a unit of decoding processing performed by the reception data decoder 25, is sixteen in the processing of step S31, the number of lines is not necessarily sixteen. In addition, although a case where image data stored in the interpolation data storage unit 42 does not include a transfer error has been described above, all the data for one field is not necessarily stored in the interpolation data storage unit 42. Furthermore, if image data for a certain number of low-frequency subbands is stored in the interpolation data storage unit 42, a necessary memory capacity can be reduced and a moving image with less noticeable loss can be achieved.

The reception data decoder 25 performs a reset operation in step S35. However, a reset operation is not necessarily performed when data having a different image size can be received from the next frame. In general, if the image size is changed, a timing of a decoding operation is changed. Thus, it is difficult to achieve a proper operation when the operation timing (in particular, operation clock) is changed. In order to avoid an operation failure, reset processing is performed for only an image compression block.

When interpolation processing for image data is performed as described above, a transmission environment is deteriorated. Thus, it is necessary to take an appropriate countermeasure for processing of audio data at that time. A process performed by the communication terminal apparatus 1 using line-based codec for receiving audio data when image data is linked with audio data will be described.

Figure 11:
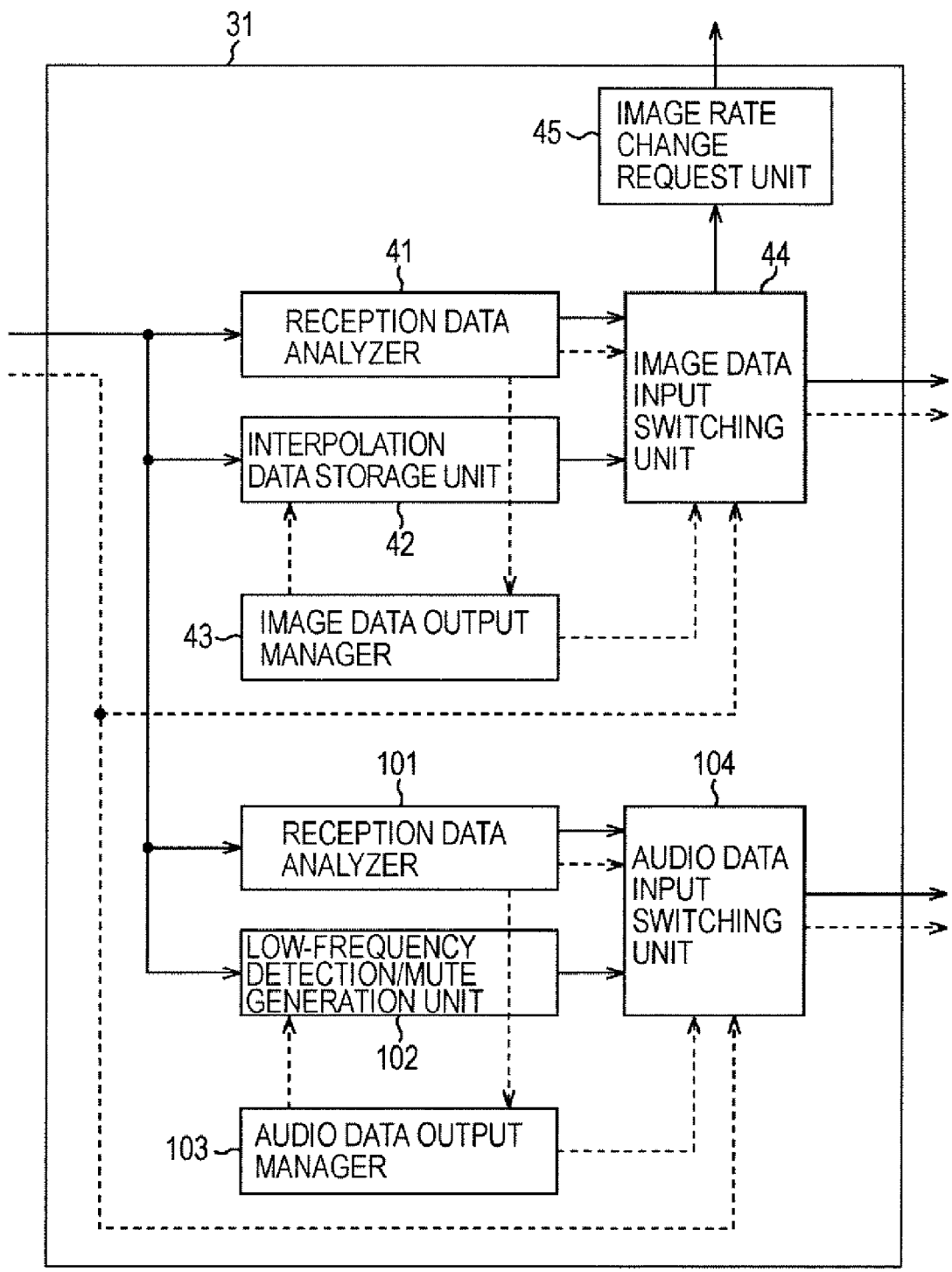
FIG. 11 is a block diagram showing an example of a detailed configuration of a line-based interpolation unit when image data is linked with audio data.

FIG. 11 is a block diagram showing an example of a detailed configuration of the line-based interpolation unit 31 when image data is linked with audio data.

Referring to FIG. 11, dotted-line arrows indicate the flow of control signals and solid-line arrows indicate the flow of data. The same component parts as in the configuration shown in FIG. 3 are referred to with the same reference numerals and the descriptions of those same component parts will be omitted in an appropriate manner. However, the transmission data image compressor 12 and the reception data decoder 25 shown in FIG. 2 perform not only image processing but also audio processing. As an audio processing method, for example, a compression method, such as MPEG Audio Layer-3 (MP3), Windows® Media Audio (WMA), RealAudio, or advanced transform acoustic coding (ATRAC), is available, and data subjected to AD conversion, such as pulse-width modulation (PCM), is used.

A reception data analyzer 101 analyzes reception data received from the reception data separator 21, and detects to which line of the screen the reception data serving as audio data corresponds. This processing block does not necessarily perform processing for each line. If line-based codec is performed for each predetermined number of lines, which is a unit smaller than a unit of a field, the processing may be performed for the predetermined number of lines.

A low-frequency detection/mute generation unit 102 has a function of generating data causing a silent state (hereinafter, referred to as mute data), which is not a function of storing previous audio data, and a function of searching for an optimal point at which audio data is replaced with mute data so as not to output high-frequency sound.

An audio data output manager 103 controls a read pointer of each of the reception data analyzer 101 and the low-frequency detection/mute generation unit 102 as management information in order for an audio data input switching unit 104 to be able to perform input switching in a short period of time. With this processing block, even if part of reception data is lost in a field, reliable sound suitable for line-based codec can be acquired.

In accordance with management information received from the audio data output manager 103 or the reception data separator 21, the audio data input switching unit 104 appropriately selects reception data supplied from the reception data analyzer 101 or mute data supplied from the low-frequency detection/mute generation unit 102, and outputs the selected data to the reception data decoder 25.

Figure 12:
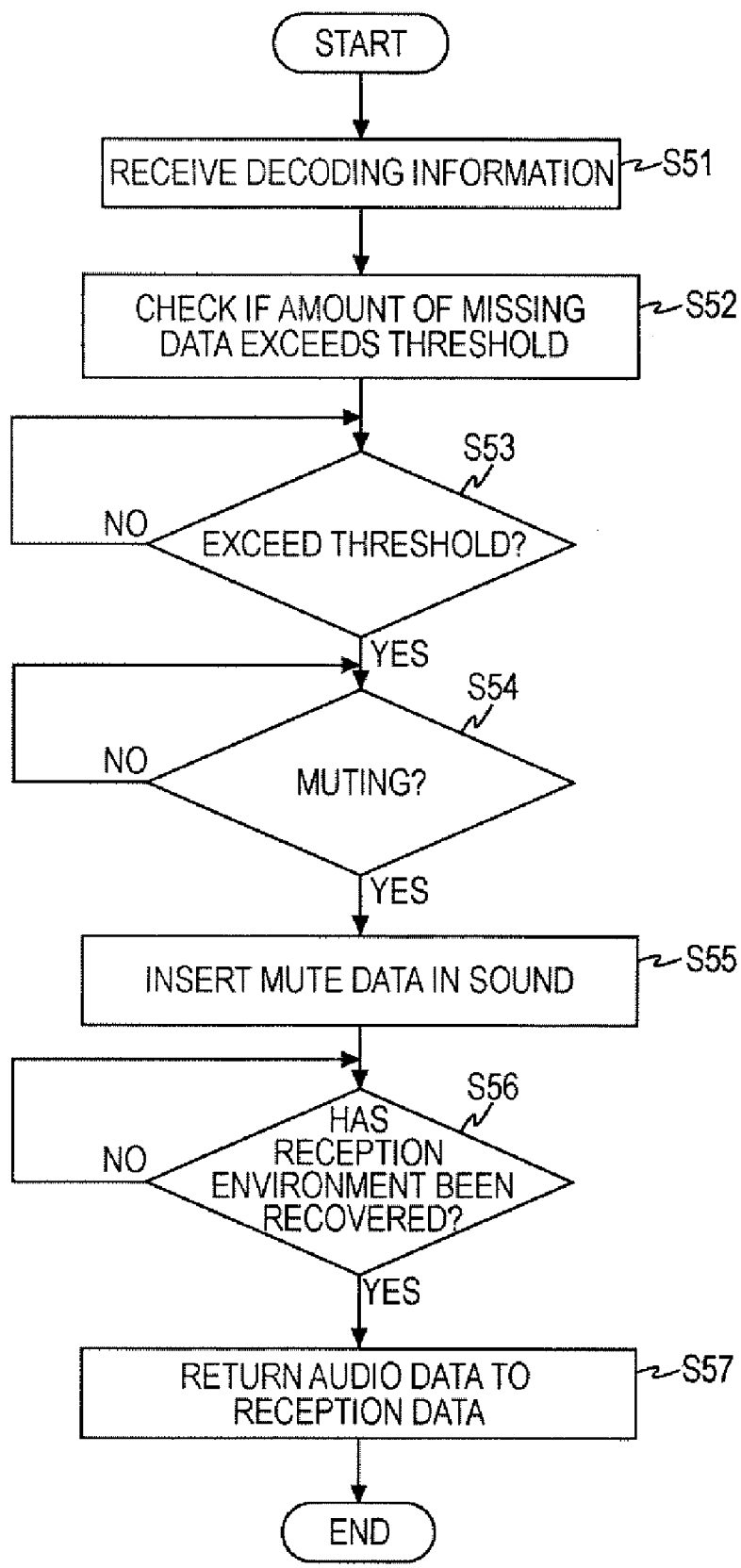
FIG. 12 is a flowchart showing a reception process.

A reception process performed by a receiving station of the communication terminal apparatus 1 shown in FIG. 11 is described next with reference to a flowchart shown in FIG. 12.

Since processing of steps S51 and S52 is similar to the processing of steps S11 and S12 described with reference to the flowchart of FIG. 8, the explanation of the processing of steps S51 and S52 will be omitted.

In step S53, the low-frequency detection/mute generation unit 102 determines whether or not the amount of error of audio data exceeds a threshold, and repeats the determination processing until it is determined that the amount of error of the audio data exceeds the threshold. If it is determined in step S53 that the amount of error of the audio data exceeds the threshold, the process proceeds to step S54. In step S54, the low-frequency detection/mute generation unit 102 determines whether or not to mute sound. In step S54, the determination is repeated until sound is shifted to low-frequency data.

If it is determined in step S54 that sound is to be muted, that is, if it is determined that sound has been shifted to low-frequency data, the process proceeds to step S55. In step S55, the low-frequency detection/mute generation unit 102 inserts mute data into sound. As mute data, for example, data having a frequency component of 0 is generated.

In step S56, the reception data separator 21 determines whether or not the reception environment has been recovered in accordance with information on parity checking, and repeats the processing of step S56 until it is determined that the reception environment has been recovered. If it is determined in step S56 that the reception environment has been recovered, the process proceeds to step S57. In step S57, audio data is returned to reception data received from the reception data analyzer 101. Then, the reception process is terminated.

With the above-described reception process, since audio data is appropriately muted during the execution of interpolation processing for image data, image data can be linked with audio data. More specifically, in order to provide a link between image data and audio data, reading of image data by the image data input switching unit 24 can be synchronized with reading of corresponding audio data or mute data. In addition, by requesting an external communication apparatus to change an encoding rate in step S56, an encoding rate of data transmitted next may be reduced, thus achieving an excellent transfer environment. Here, the term "encoding rate" includes both image encoding rate and audio encoding rate. In addition, since the interpolation processing time for line-based codec may be short, an algorithm for muting audio data that is linked with image data in a short time is configured. In this case, interpolation for audio data and image data may be performed in synchronization with each other or interpolation may be individually performed for sound.

Figure 13:
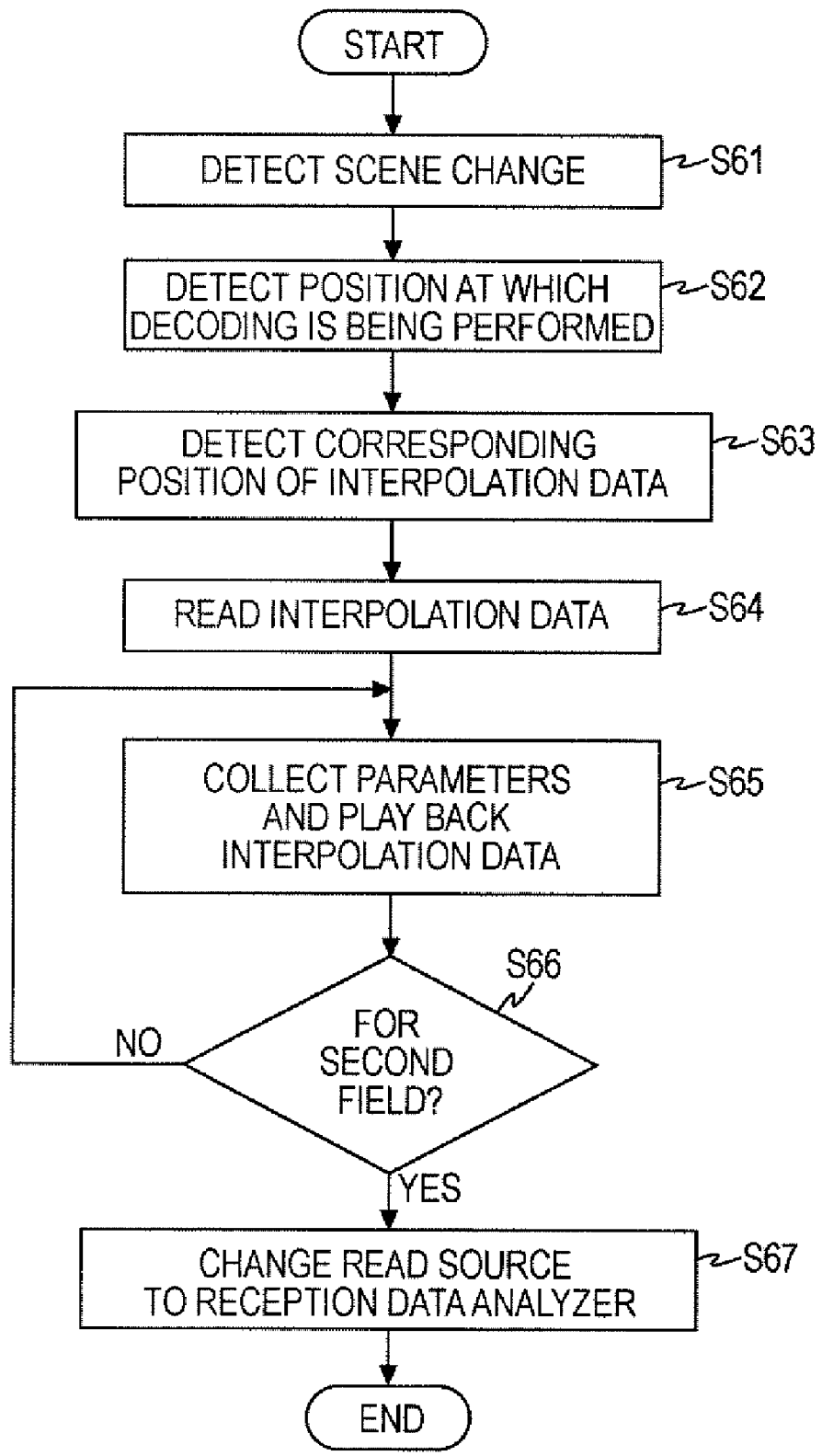
FIG. 13 is a flowchart showing a playback process.

In addition, for a case where image quality greatly changes, such as a scene change of a moving image, it is necessary to take an appropriate countermeasure. That is, in the above-described codec, a better image quality can be achieved by transferring a smaller amount of parameter information in a time-axis direction between frames, although which is different from MPEG or JPEG 2000. However, a usage under a situation, such as scene changing or channel switching, is an important issue. Thus, a playback process performed by the communication terminal apparatus 1 shown in FIG. 2 using line-based codec when a scene change of a moving image occurs will be described with reference to a flowchart shown in FIG. 13.

In step S61, the image data output manager 43 detects a scene change. In step S62, the image data output manager 43 detects a position of an image at which decoding is being performed on the basis of data being decoded by the reception data decoder 25. In step S63, the image data output manager 43 detects a corresponding position of the interpolation data of the immediately previous field having no error stored in a save area of the interpolation data storage unit 42 on the basis of the positional information obtained by the processing of step S62.

In step S64, the image data output manager 43 reads from the interpolation data storage unit 42 the interpolation data from the corresponding position detected by the processing of step S63, and transfers the read interpolation data to the reception data decoder 25 via the image data input switching unit 44. That is, if a scene change occurs, the immediately previous field stored in the interpolation data storage unit 42 is played back. In addition, the reception data decoder 25 collects parameter information necessary between frames for the scene change, and the image rate change request unit 45 requests an external communication apparatus to perform re-configuration of an inter-frame parameter.

In step S65, the reception data decoder 25 decodes and plays back the interpolation data read from the interpolation data storage unit 42 while collecting and storing parameter information for one field for the scene change. The parameter information is collected by referring to previous information.

In step S66, the reception data decoder 25 determines whether or not parameter collection is performed for the second field. If it is determined that the parameter collection is not performed for the second field, that is, if it is determined that the parameter collection is performed for the first field, the process returns to step S65. Then, the above-described processing is repeated.

If it is determined in step S66 that the parameter collection is performed for the second field, the process proceeds to step S67. In step S67, the image data input switching unit 44 changes a read source of data to be played back from the interpolation data storage unit 42 to the reception data analyzer 41. Then, the playback process is terminated.

With the above-described playback process, even when a scene change of a moving image occurs, playback can be performed without deteriorating image quality. Although parameter information for one field for a scene change is collected during playback of interpolation data in step S65, parameter information for one frame may be collected or broadcasting channel switching may be performed. If broadcasting channel switching is performed, a black field is often displayed so that a tuner performs frequency switching. Parameter information may be collected while the black field is being played back. As described above, parameter information is collected by referring to previous information. In broadcasting channel switching, since parameters do not have correlation, setting may be initialized.

It is difficult to perform image interpolation using line-based codec since it is not necessary to store image data for one field. However, since the line-based interpolation unit 31, which has a function of storing compressed image data not including data missing and performing switching between reception data and interpolation data if the amount of error exceeds a threshold set in advance, is provided upstream of the reception data decoder 25 of the receiving station, image interpolation can be achieved with a smaller memory capacity.

In addition, if the communication environment is deteriorated, an excellent communication environment can be achieved by changing an encoding rate at a high speed by using an interpolation memory. An input clock may be changed due to a change of a codec rate. However, this problem can be solved by re-configuring codec by using the interpolation memory.

In addition, by reducing the number of subbands stored in the interpolation data storage unit 42 by using the characteristics of wavelet transform used in line-based codec, a memory capacity reduction can be achieved.

By linking image data with audio data, the timing at which audio data is muted when interpolation processing is performed using line-based codec can be optimally controlled.

In addition, when a scene change occurs, by creating time for correcting an error of setting parameters, which is a problem unique to line-based codec, by using an interpolation memory, an image can be played back using an optimal parameter.

The foregoing series of processing may be performed by hardware or software. If the foregoing series of processing is performed by software, a program constituting the software is installed from a program recording medium on a computer installed in dedicated hardware or, for example, a general-purpose personal computer capable of performing various functions by installing various programs.

Figure 14:
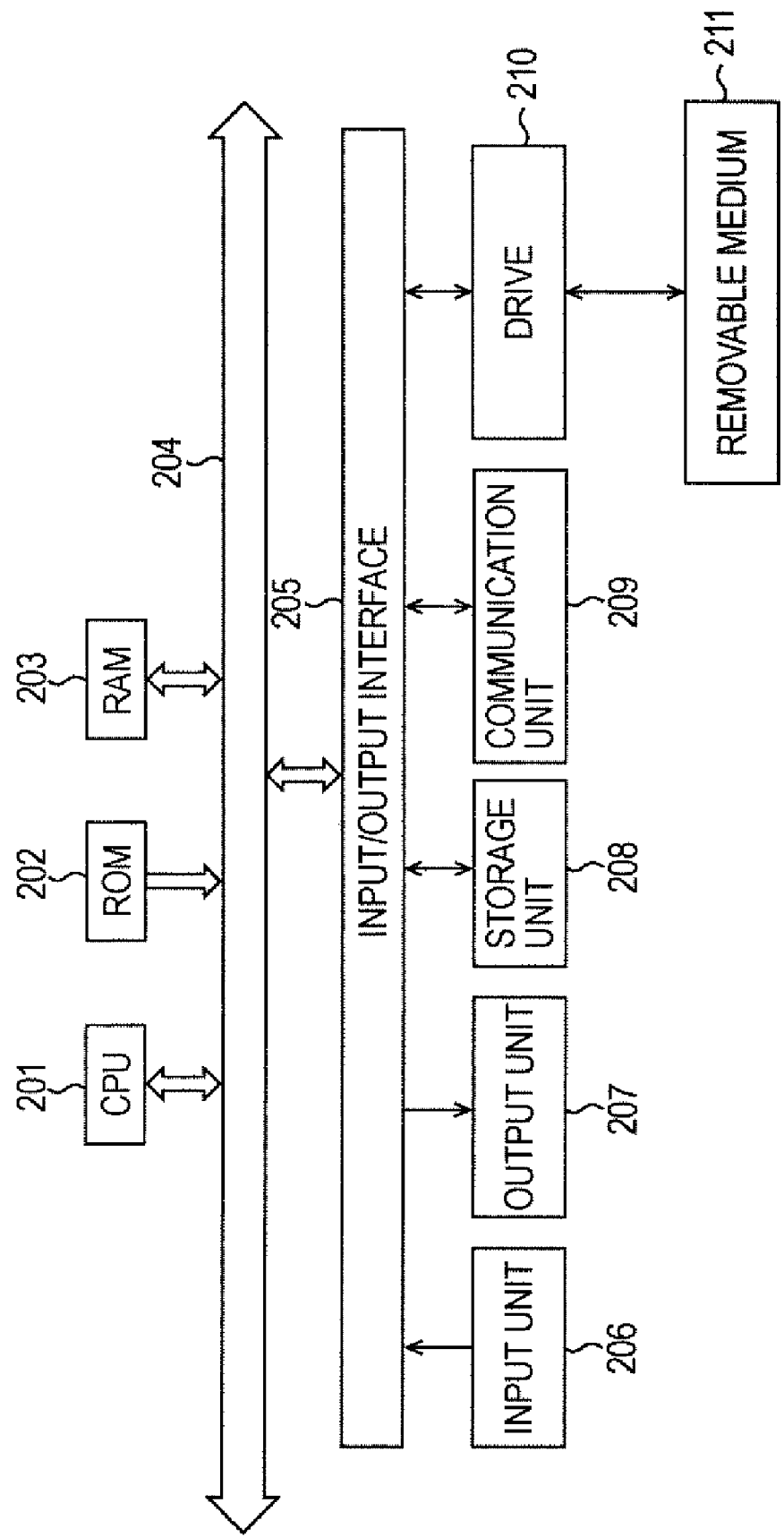
FIG. 14 is a block diagram showing an example of a configuration of a personal computer.

FIG. 14 is a block diagram showing an example of a configuration of a personal computer that executes the above-described series of processing stored in a program.

A CPU 201 executes various types of processing in accordance with a program stored in a read-only memory (ROM) 202 or a storage unit 208. A program, data, and the like to be executed by the CPU 201 are stored in a random-access memory (RAM) 203 in an appropriate manner. The CPU 201, the ROM 202, and the RAM 203 are connected to each other with a bus 204 therebetween.

An input/output interface 205 is connected to the CPU 201 with the bus 204 therebetween. An input unit 206 including a keyboard, a mouse, a microphone, and the like and an output unit 207 including a display, a speaker, and the like are connected to the input/output interface 205. The CPU 201 executes various types of processing in accordance with an instruction input via the input unit 206. Then, the CPU 201 outputs a processed result to the output unit 207.

The storage unit 208 that is connected to the input/output interface 205 includes, for example, a hard disk. A program to be executed by the CPU 201 and various data are stored in the storage unit 208. A communication unit 209 communicates with an external apparatus via a network, such as the Internet or a local area network.

When a removable medium 211, such as a magnetic disc, an optical disc, a magneto-optical disc, or a semiconductor memory, is mounted in a drive 210 connected to the input/output interface 205, the drive 210 drives the removable medium 211 and acquires a program or data recorded in the removable medium 211. The acquired program or data is transferred to the storage unit 208 where appropriate, and stored in the storage unit 208.

The program recording medium that is installed on the computer and that stores a program executable by the computer includes, for example, the removable medium 211, which is a package medium, such as a magnetic disc (e.g., a flexible disc), an optical disc (e.g., compact disc read-only memory (CD-ROM) or a digital versatile disc (DVD)), a magneto-optical disc, or a semiconductor memory, the ROM 202 in which a program is temporarily or permanently stored, and the hard disk forming the storage unit 208, as shown in FIG. 14. A program is stored into the program recording medium using a wired or wireless communication medium, such as a local area network, the Internet, or digital satellite broadcasting, via the communication unit 209, which is an interface, such as a router or a modem, where appropriate.

In this specification, steps defining a program stored in the program storage medium are not necessarily performed in chronological order in accordance with the written order. The steps may be performed in parallel or independently without being performed in chronological order.

It should be understood by those skilled in the art that various modifications, combinations, sub-combinations and alterations may occur depending on design requirements and other factors insofar as they are within the scope of the appended claims or the equivalents thereof.

What is claimed is:

1. A communication apparatus for dividing an image for one field into groups, the groups including N lines (N≧1), and performing compression/decompression for the groups, comprising:
    means for separating image data from reception data;
    means for determining whether an error exists in the separated image data;
    means for storing the separated image data as interpolation data;
    means for decoding the separated image data;
    means for detecting a decoding position of the separated image data and a corresponding position of the stored interpolation data when the means for determining determines that an error exists and that an amount of data missing from the separated image data exceeds a threshold;
    means for reading the stored interpolation data based on the detected decoding position of the separated image data and the detected corresponding position of the stored interpolation data;
    means for inserting additional data, wherein:
        the means for separating separates audio data from the reception data,
        the means for determining determines whether an amount of the separated image data exceeds an image-data threshold, and
        the means for inserting reads the audio data according to a reading timing of the means for decoding and inserts the additional data when an amount of separated audio data does not exceed an audio-data threshold; and
    wherein the separated image data is stored as interpolation data when the means for determining determines that no error exists; and
    means for outputting the read interpolation data, as an alternative to the separated image data, to the means for decoding.

2. The communication apparatus according to claim 1, wherein the means for determining determines whether the amount of missing image data exceeds the threshold by acquiring decoding information from the means for decoding.

3. The communication apparatus according to claim 1, wherein the means for storing stores only image data of a predetermined sub-band.

4. The communication apparatus according to claim 1, further comprising:
    image input switching means for selecting the separated image data or the output interpolation data; and
    means for transferring the selected image data or the selected interpolation data to the means for decoding.

5. The communication apparatus according to claim 4, wherein:
    the means for decoding performs re-configuration; and
    the image input switching means selects the output interpolation data during execution of the re-configuration.

6. The communication apparatus according to claim 1, further comprising:
    means for deleting the oldest stored interpolation data when the means for storing is incapable of storing more data.

7. The communication apparatus according to claim 1, further comprising:
    means for requesting an external communication apparatus for an encoding rate change when the means for determining determines that the amount of missing data exceeds the threshold.

8. The communication apparatus according to claim 1, wherein when the amount of separated audio data exceeds the audio-data threshold, the means for inserting inserts mute data into the separated audio data.

9. The communication apparatus according to claim 1, wherein:
    the means for determining determines whether the amount of separated audio data exceeds the audio-data threshold, and
    when the amount of separated image data exceeds the image-data threshold and the amount of separated audio data does not exceed the audio-data threshold, the means for inserting does not insert mute data into the separated audio data.

10. The communication apparatus according to claim 1, further comprising:
    means for compressing image data using an encoding rate requested by an external communication apparatus; and
    means for transmitting the compressed image data.

11. The communication apparatus according to claim 1, further comprising:
    means for inserting mute data, wherein:
        the means for separating separates audio data from the reception data,
        the means for determining determines whether an amount of the separated audio data exceeds an audio-data threshold, and
        when the means for determining determines that the amount of separated audio data exceeds the audio-data threshold, the means for inserting inserts the mute data into the separated audio data.

12. The communication apparatus according to claim 1, further comprising:
    means for detecting a scene change in the separated image data, wherein when the means for detecting a scene change detects a scene change, the means for reading reads the stored interpolation data based on the detected decoding position of the separated image data and the detected corresponding position of the stored interpolation data.

13. The communication apparatus according to claim 12, further comprising:
    means for requesting an external communication apparatus to reconfigure an inter-frame parameter when the means for detecting a scene change detects a scene change.

14. The communication apparatus according to claim 1, wherein the means for determining determines whether an error exists in the separated image data based on parity information added to the image data or on an amount of data decoded.

15. The communication apparatus according to claim 1, wherein:
    the means for storing stores image data for a plurality of sub-bands; and
    the means for detecting inserts dummy data into the separated image data for a sub-band not stored in the means for storing.

16. The communication apparatus according to claim 1, further comprising:
    management means for linking the detected decoding position of the separated image data with a reading position of the stored interpolation data; and
    means for selecting between the separated image data and the stored interpolation data based on the threshold.

17. The communication apparatus according to claim 16, wherein the management means inserts dummy data into a missing portion of the separated image data when the threshold is not exceeded.

18. The communication apparatus according to claim 17, wherein the dummy data includes data having a high correlation between preceding and subsequent line blocks or halftone data.

19. The communication apparatus according to claim 17, wherein once the dummy data has been inserted, the management means deletes image data in a sub-band and inserts associated dummy data into the sub-band for the groups.

20. A communication method for dividing an image for one field into groups, the groups including N lines (N≧1), and performing compression/decompression for the groups, comprising:
    separating image data from reception data;
    determining whether an error exists in the separated image data;
    storing the separated image data as interpolation data;
    decoding the separated image data;
    detecting a decoding position of the separated image data and a corresponding position of the stored interpolation data when it is determined that an error exists and that an amount of data missing from the separated image data exceeds a threshold;
    reading the stored interpolation data in accordance with the detected decoding position of the separated image data and the detected corresponding position of the stored interpolation data;
    inserting additional data, comprising the steps of:
        separating audio data from the reception data,
        determining whether an amount of the separated image data exceeds an image-data threshold, and
        reading the audio data according to a reading timing and inserting the additional data when an amount of separated audio data does not exceed an audio-data threshold; and
    wherein the separated image data is stored as interpolation data when it is determined that no error exists; and
    outputting the read interpolation data, as an alternative to the separated image data, to a decoder.

21. A communication transmission and reception apparatus for dividing an image for one field into groups, the groups including N lines (N≧1), and performing compression/decompression for the groups, comprising:
    means for separating image data from reception data;
    means for determining whether an error exists in the image data separated by the means for separating;
    means for storing the separated image data as interpolation data;
    means for decoding the separated image data;
    means for detecting a decoding position of the separated image data and a corresponding position of the stored interpolation data when the means for determining determines that an error exists and that an amount of data missing from the separated image data exceeds a threshold;
    means for reading the stored interpolation data based on the detected decoding position of the separated image data and the detected corresponding position of the stored interpolation data;
    means for inserting additional data, wherein:
        the means for separating separates audio data from the reception data
        the means for determining determines whether an amount of the separated image data exceeds an image-data threshold, and
        the means for inserting reads the audio data according to a reading timing of the means for decoding and inserts the additional data when an amount of separated audio data does not exceed an audio-data threshold; and
    wherein the separated image data is stored as interpolation data when the means for determining determines that no error exists;
    means for outputting the read interpolation data, as an alternative to the separated image data, to the means for decoding;
    means for requesting an external communication apparatus to change an encoding rate;
    means for compressing image data at the changed encoding rate; and
    means for transmitting the compressed image data.

22. A communication transmission and reception method for dividing an image for one field into groups, the groups including N lines (N≧1), and performing compression/decompression for the groups, comprising:
    separating image data from reception data;
    determining whether an error exists in the separated image data;
    storing the separated image data as interpolation data;
    decoding the separated image data;
    detecting a decoding position of the separated image data and a corresponding position of the stored interpolation data when it is determined that an error exists and that an amount of data missing from the separated image data exceeds a threshold;

reading the stored interpolation data based on the detected decoding position of the separated image data and the detected corresponding position of the stored interpolation data;

inserting additional data, comprising:
separating audio data from the reception data,
determining whether an amount of the separated image data exceeds an image-data threshold, and
reading the audio data according to a reading timing of the means for decoding and inserting the additional data when an amount of separated audio data does not exceed an audio-data threshold; and wherein the separated image data is stored as interpolation data when it is determined that no error exists; and outputting the read interpolation data, as an alternative to the separated image data, for decoding;

requesting an external communication apparatus to change an encoding rate;

compressing image data at the changed encoding rate; and transmitting the compressed image data.

23. A communication apparatus for dividing an image for one field into groups, the groups including N lines (N≧1), and performing compression/decompression for the groups, comprising:
at least one processor;
a separator configured to separate image data from reception data;
a determination unit configured to determine whether an error exists in the separated image data;
a storage unit configured to store the separated image data as interpolation data;
a decoding unit configured to decode the separated image data;
a detection unit, executing on the at least one processor, configured to detect a decoding position of the separated image data and a corresponding position of the stored interpolation data when the determination unit determines that an error exists and that an amount of data missing from the stored image data exceeds a threshold;
a reading unit configured to read the stored interpolation data based on the detected decoding position of the separated image data and the detected corresponding position of the stored interpolation data;
means for inserting additional data, wherein:
the separator is further configured to separate audio data from the reception data,
the determination unit is further configured to determine whether an amount of the separated image data exceeds an image-data threshold, and
the means for inserting is configured to read the audio data according to a reading timing of the decoding unit and insert the additional data when an amount of separated audio data does not exceed an audio-data threshold, and wherein the separated image data is stored as interpolation data when the determination unit determines that no error exists; and
an output unit configured to output the read interpolation data, as an alternative to the separated image data, to the decoding unit.

24. A communication transmission and reception apparatus for dividing an image for one field into groups, the groups including N lines (N≧1), and performing compression/decompression for the groups, comprising:
at least one processor;
a separator configured to separate image data from reception data;
a determination unit configured to determine whether an error exists in the separated image data;
a storage unit configured to store the separated image data as interpolation data;
a decoder configured to decode the separated image data;
a detection unit, executing on the at least one processor, configured to detect a decoding position of the separated image data and a corresponding position of the stored interpolation data when the determination unit determines that an error exists and that an amount of data missing from the separated image data exceeds a threshold;
a reading unit configured to read the stored interpolation data based on the detected decoding position of the separated image data and the detected corresponding position of the stored interpolation data;
means for inserting additional data, wherein:
the separator is further configured to separate audio data from the reception data,
the determination unit is further configured to determine whether an amount of the separated image data exceeds an image-data threshold, and
the means for inserting is configured to read the audio data according to a reading timing of the decoding unit and insert the additional data when an amount of separated audio data does not exceed an audio-data threshold; and wherein the separated image data is stored as interpolation data when the determination unit determines that no error exists;
an output unit for outputting the read interpolation data, as an alternative to the separated image data, to the decoder;
a request unit configured to request an external communication apparatus to change an encoding rate;
a compression unit configured to compress image data at the changed encoding rate; and
a transmission unit configured to transmit the compressed image data.

* * * * *